(12) United States Patent
Glottmann

(10) Patent No.: US 11,032,752 B2
(45) Date of Patent: Jun. 8, 2021

(54) AD HOC NETWORK ROUTING

(71) Applicant: Oscar Glottmann, Haifa (IL)

(72) Inventor: Oscar Glottmann, Haifa (IL)

(*) Notice: Subject to any disclaimer, the term of this patent is extended or adjusted under 35 U.S.C. 154(b) by 57 days.

(21) Appl. No.: 16/161,089

(22) Filed: Oct. 16, 2018

(65) Prior Publication Data

US 2019/0116544 A1    Apr. 18, 2019

(30) Foreign Application Priority Data

Oct. 16, 2017 (IL) .......................................... 255043

(51) Int. Cl.
*H04W 40/30* (2009.01)
*H04W 84/18* (2009.01)
*H04W 88/06* (2009.01)
*H04L 12/715* (2013.01)

(52) U.S. Cl.
CPC ........... *H04W 40/30* (2013.01); *H04W 84/18* (2013.01); *H04W 88/06* (2013.01); *H04L 45/64* (2013.01)

(58) Field of Classification Search
CPC ............ H04B 7/18513; H04B 7/18521; H04B 7/195; H04B 7/19; H04B 7/18504; H04B 10/118; H04B 7/18515; H04B 7/185; H04B 7/18506; H04B 7/18508
See application file for complete search history.

(56) References Cited

U.S. PATENT DOCUMENTS

| 9,906,291 | B1* | 2/2018 | Nakamura | ......... H04B 7/18521 |
| 2008/0159151 | A1 | 7/2008 | Datz et al. | |
| 2009/0323519 | A1 | 12/2009 | Pun | |
| 2012/0026877 | A1* | 2/2012 | Rajappan | ............. H04L 47/724 370/235 |
| 2016/0050013 | A1* | 2/2016 | Brownjohn | ........ H04B 7/18508 370/316 |
| 2016/0099770 | A1 | 4/2016 | Glottman | |

(Continued)

FOREIGN PATENT DOCUMENTS

| EP | 1376939 | 1/2004 |
| EP | 1797651 | 4/2012 |
| EP | 2777359 | 10/2016 |

OTHER PUBLICATIONS

Office Action and Search Report dated Apr. 12, 2018 from the Israel Patent Office Re. Application No. 255043. (9 pages).

(Continued)

*Primary Examiner* — Asad M Nawaz
*Assistant Examiner* — Najeeb Ansari

(57) ABSTRACT

Overlay apparatus for an ad-hoc/MESH communication network, the network having nodes, at least some of which are mobile with respect to other nodes. The nodes establish and abandon connections as they move with respect to one another and generally requiring relatively small bandwidth communications in order to generate and maintain an ad-hoc/MESH physical network of the nodes and the overlay apparatus, but very occasionally a large bandwidth communication is made. The overlay apparatus may reserve at least one assured protected communication path between a source node of such a relatively large bandwidth communication and at least one destination node of the relatively large bandwidth communication via one or more intervening nodes according to a current topology configuration of the connections of the ad hoc/MESH network.

16 Claims, 18 Drawing Sheets

(56) References Cited

U.S. PATENT DOCUMENTS

2016/0316377 A1* 10/2016 Hooey ................ H04W 16/18
2017/0026898 A1* 1/2017 Dearlove ............. B64C 39/024

OTHER PUBLICATIONS

Office Action dated Sep. 20, 2018 from the Israel Patent Office Re. Application No. 255043 and its Translation Into English. (4 pages).
Notice of Allowance and Allowed Application dated Mar. 18, 2019 from the Israeli Patent Office Re. Application No. 255043 and its Translation to English. (74 pages).

* cited by examiner

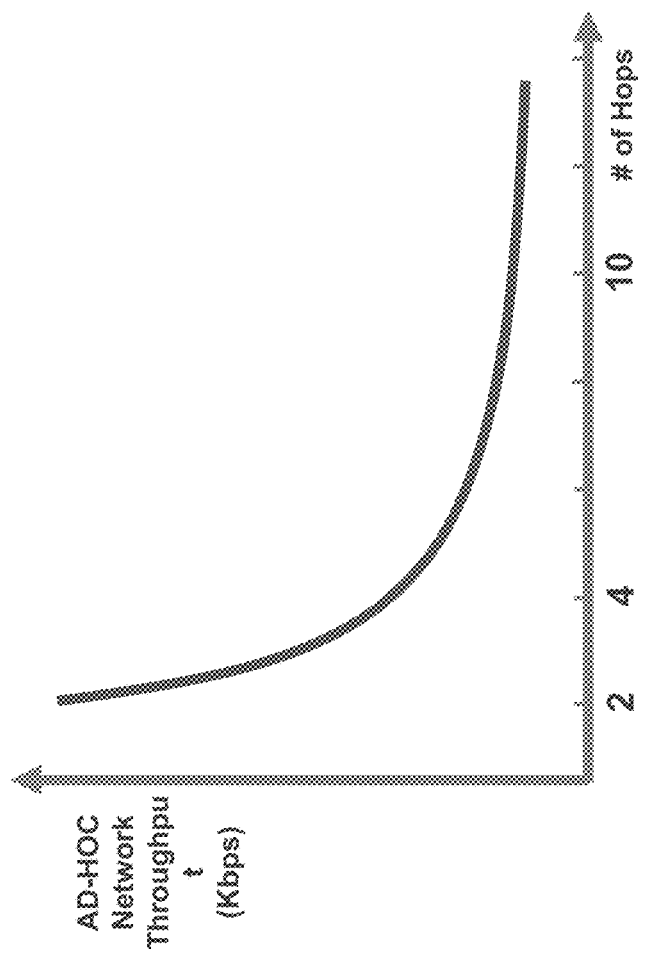
FIG. 2 – Prior Art
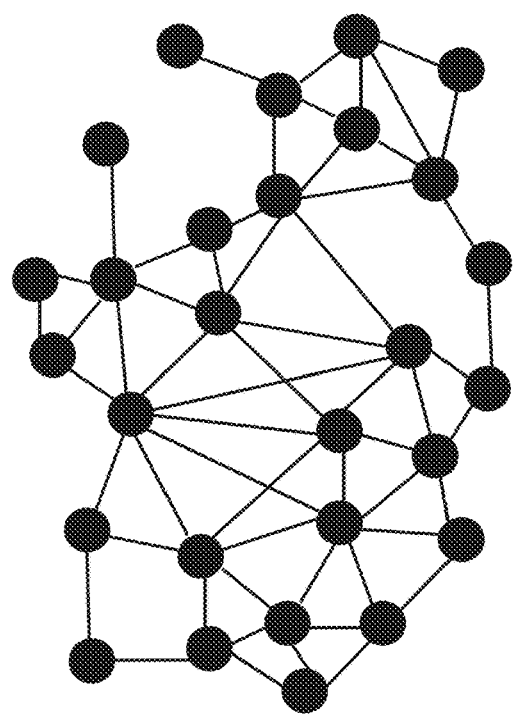
Fig. 1
Prior Art

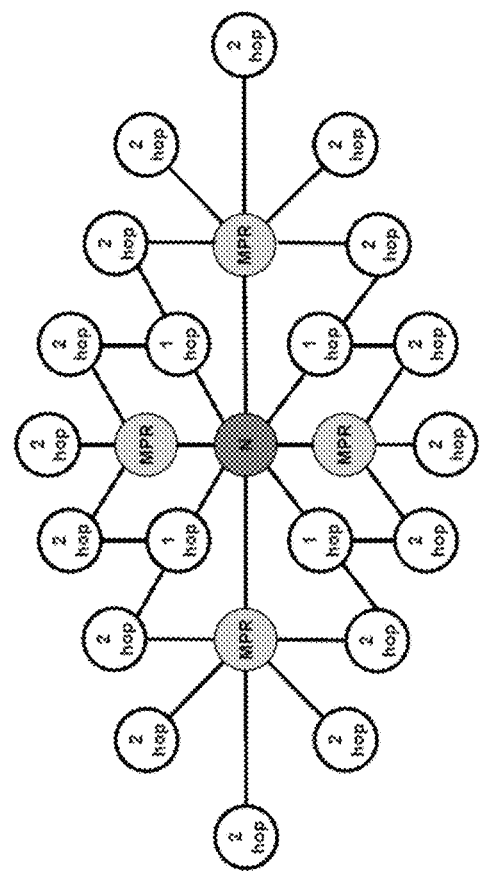
Fig. 5C OLSR MPR and regular nodes network organization after MPR selection
Prior Art
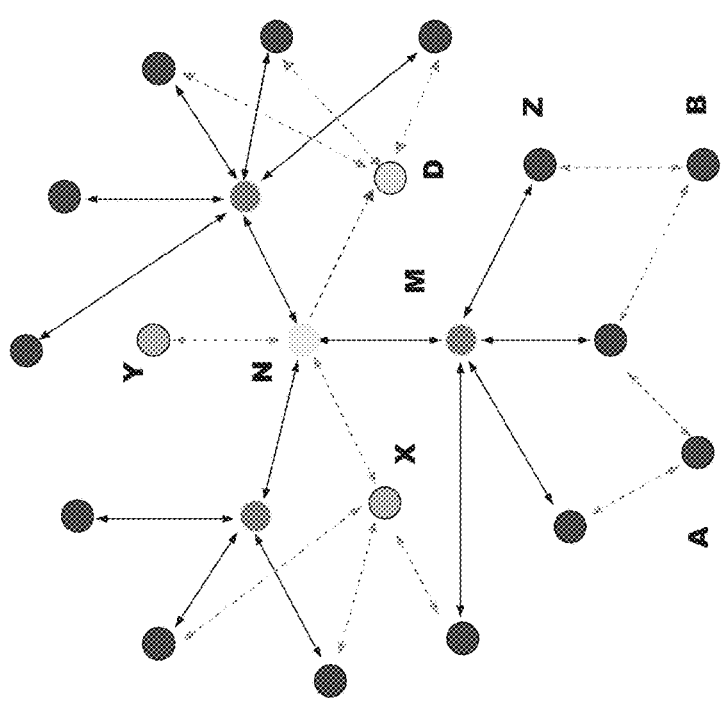
Fig. 5B Optimized Link State routing protocol-OLSR multipoint relays-MPR nodes selection among all network nodes example
Prior Art

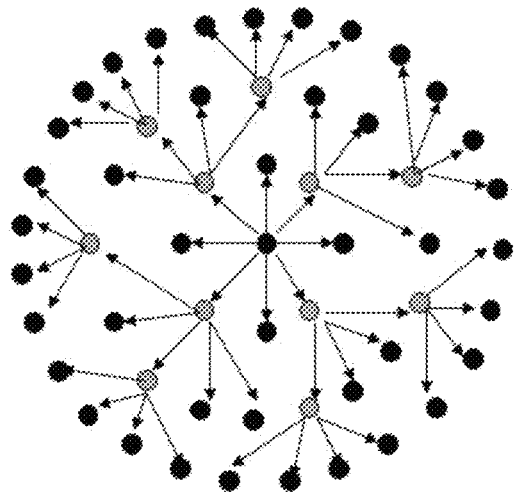
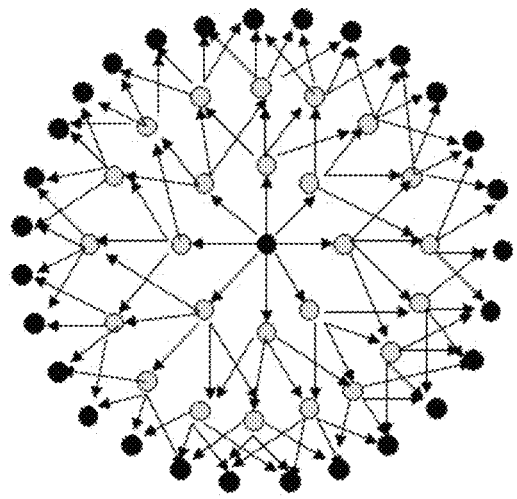
Fig. 5D
Prior Art

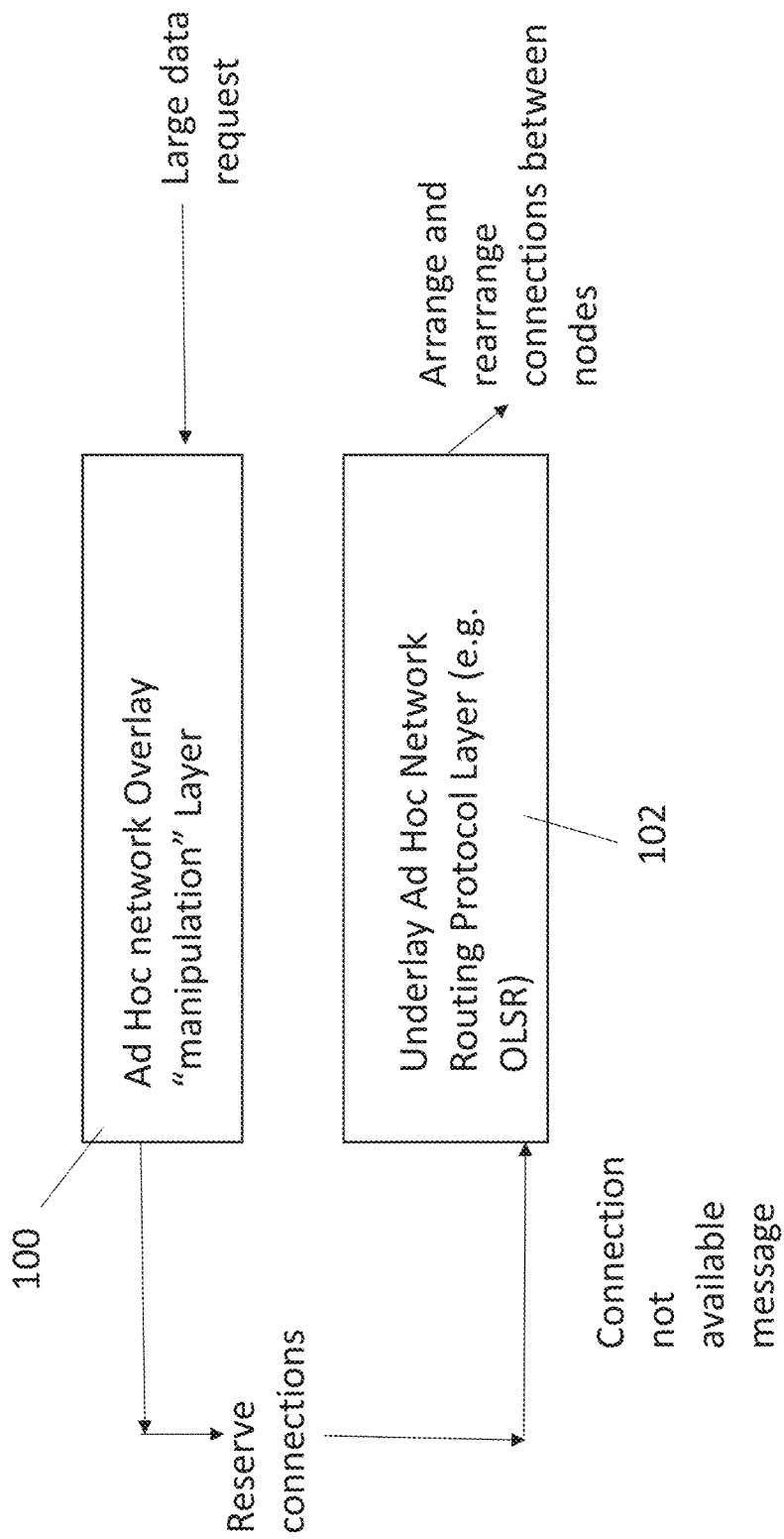

AD HOC NETWORK ROUTING

RELATED APPLICATIONS

This application claims the benefit of priority of Israel Patent Application No. 255043 filed on Oct. 16, 2017, the contents of which are incorporated by reference as if fully set forth herein in their entirety.

FIELD AND BACKGROUND OF THE INVENTION

The present invention, in some embodiments thereof, relates to ad hoc networks and, more particularly, but not exclusively, to ad hoc networks set up by mobile entities as they move, for example satellites, autonomous vehicles or drones, autonomous aircraft, watercraft and autonomous watercraft, and vehicles in general (Airborne, maritime, vehicular) and even persons on foot wanting to transmit large amounts of information between each other.

In particular autonomous vehicles or craft or satellites may want to transmit specific items of information, some larger than others, over an ad hoc network that the vehicles form and reform in motion to relay to targets. The information may range from control and protocol data to voice, image and video traffic.

An example where ad hoc networks can be used is with groups of satellites communicating between each other, where satellites may be in low earth orbit—LEO, mid-earth orbit—MEO, and geostationary orbit—GEO or highly elliptical orbit (HEO). LEO, MEO and HEO satellites that communicate with ground stations are only occasionally in line of site of their ground station. GEO satellites are always capable of communicating with their ground station(s).

For high definition ground imaging (photo or video), satellites in low earth orbits (LEO) are generally used. Images are taken as these LEO satellites pass over specific parts of the earth, to be then downloaded to earth when the satellite is in line of sight of a ground station. Typically to cover the entire earth's surface a larger number of such LEO satellites at different orbits are required, and are often referred to as a LEO satellite constellation. In imaging applications, such satellites may record the images of the designated areas in their path, and when they are visible by the ground station, for example every 84 to 127 minutes, may use the narrow window of visibility of the ground station to download the recorded images. This implies that such images are not being transmitted to the ground station in "real-time", namely at the time they are taken but sometime thereafter, possibly as much as 127 minutes later.

In certain applications, an interested party may require to see images in near "real-time", namely at the same time the pictures are being recorded or as close as possible up to a few seconds later, and this is not possible in the above-mentioned mode of operation, where image download is only possible when the specific satellite that obtains images from a certain part of the world moves along the orbit to a position where it is visible from the ground station and images can only be downloaded with a sizeable delay following capture.

In the event in the above example that we would like to receive in the ground station pictures from a satellite not currently visible from the ground station in real-time, such a satellite would be required to utilize other LEO, MEO, GEO or HEO satellites visible from his current location in a chain of relay satellites ultimately reaching the satellite that is currently visible from the ground station so the images can be downloaded. Each such relay transfer we name a hop, and so images currently taken by a LEO satellite would require one or more hops through other satellites in order to reach the satellite that is currently visible from the ground station, and then the recorded images would be downloaded to the ground station arriving at a time equal to the latency introduced by each hop in the path from the recording satellite to the downloading satellite plus the time it takes to download the images. Should there be congestion in the path and multiple hops, the image may arrive too late, or arrive in pieces that need to be reassembled, as high-resolution images and videos may be very large.

The above example may be applied to imaging applications not only for satellites but for any mobile wireless radio devices, where the device taking the picture, and the destination device are not visible directly, but can only make contact through relay devices (Hops).

If we explore the above-mentioned example of satellites recording high resolution pictures on one side of the world, and the recipient interested in viewing these images in real-time or near real-time but who happens to be located on the other side of the world, the communication of the image may utilize multiple satellites along the shortest path to the recipient to relay these images. Since LEO satellites are only visible for a set time window from the ground station, if these high resolution images are not transferred in time, they would need to be relayed to the next satellite visible from the ground station to complete the transfer.

For the above mentioned purpose, multiple satellites may set up an ad-hoc or Mesh-routed network between them and have each satellite or other hop in the path forward these high resolution images to the next satellite or other hop until they reach the recipient.

The problem that arises by making these unidirectional satellites two-way satellites in a classical ad-hoc network is that ad-hoc networks capacity to relay data drops dramatically with large volumes of data and high traffic and data rates, and thus cannot ensure that these high resolution images will be delivered in their entirety and in the available/designated time. An ad hoc network sends data by different paths as the opportunity arises and thus capacity levels rise and fall. Large capacity data is therefore difficult to pass over such an ad hoc network.

In an Ad-Hoc network, sometimes also referred to MANET (mobile ad-hoc network), each node/satellite may see various other nodes/satellites, and there may be several paths going through different nodes/satellites to reach the node/satellite that is currently over a ground station and can transmit the images/video/other sensor information to the ground station, to be received by the recipient behind the ground station local or terrestrial network. Moreover, just as in radio MANETs, Satellite positioning and other space factors may cause these satellites to sometimes disconnect from each other so that satellite interconnection may be volatile.

LEO Satellites that are solely utilized for off-line high-resolution imaging recorded into memory and downloading only when ground station is visible, are typically equipped with unidirectional communication capabilities, namely from the satellite to the ground station, communication being activated when the ground station receive equipment is reachable.

In order for LEO satellites or other satellites that are only visible from the ground station for limited periods of time (not on a constant basis like GEO satellites) to be capable of transmitting images in real-time through other satellites, such satellites need to be equipped with bi-directional capabilities, namely to transmit to other satellites and ground station, and to receive from other satellites.

Once such satellites are equipped with bi-directional communication capabilities, such satellites may be launched to form a constellation of satellites, where satellites form a mesh network around the earth on different orbits in an example formation shown in FIG. 1, and are required to form an ad-hoc or routed network to provide a path to the ground station. The number of satellites in a constellation varies based on a number of factors, among them the distance between the satellites, the number of orbits, and the required number of satellites, so there is a satellite visible from the ground station at all times. The images may be relayed over various satellites to reach the one satellite that can transmit to ground, which implies variable length and number of hops paths. The data may change path as the state of the network changes, and FIG. 2 illustrates how the throughput varies with number of hops. FIG. 3 shows the disruption in greater detail, and shows how the effect is greater the larger the data size. That is to say, the network may suffer from performance degradation and latency and as a result, since the window of opportunity for transfer to ground station is also limited in time (30-45 mins perhaps for an individual satellite), a solution for such a network to ensure delivery of images/video in real-time over a volatile and multi-hop network is required.

Ad hoc and routed mesh networks may have the following properties: They may be self-forming, self-healing, have no single point of failure, may allow peer-to-peer communications, are predominantly mobile and wireless, require no pre-existing network infrastructure, have a highly dynamic topology, allow for auto-recovery from connection changes, and do not require any central management to function.

Ad hoc and other mesh networks may be based in IP layer 2 and layer 3, and mesh network topologies formed by specific Layer 2 and Layer 3 switches and routers supporting MESH topologies (e.g. BGP, MPLS). Such networks tend to be less dynamic than wireless Mobile Ad-Hoc Networks or MANETs. In MANETs each node functions like a Router and is responsible for network discovery and routing decisions based on dynamically discovered routing tables.

Advantages of Deployed Ad Hoc Networks

TABLE 1

| Advantages of Ad Hoc Networks | |
|---|---|
| Self-forming | Nodes that come within radio range of each other can establish a network association without any pre-configuration or manual intervention. |
| Self-healing | Nodes can join or leave rapidly without affecting operation of the remaining nodes. |
| No Infrastructure | In an ad hoc network, mobile nodes form their own network and essentially become their own infrastructure. |
| Peer-to-peer | Traditional networks typically support end systems operating in client-server mode. In an ad hoc network, mobile nodes can communicate and exchange information without prior arrangement and without reliance on centralized resources. |
| Predominantly wireless | Historically, networks have been mostly wired and enhanced or extended through wireless access. The ad hoc environment is essentially wireless, but can be extended to support wired resources. |
| Highly dynamic | Mobile nodes are in continuous motion, and ad hoc networking topologies are constantly changing. |

As explained above, ad hoc networks have certain disadvantages. Thus the network efficiency decreases as a function of the number of nodes and hops. The network efficiency and performance also decreases with higher throughput. Mobility and terrain make it hard to predict network congestion bottlenecks. Intermittent loss of connectivity between nodes may increase traffic bottlenecks. It may be difficult to implement end-to-end QoS, Application & User prioritization. Ad-Hoc networks are less efficient for Multicast & Broadcast transmissions.

Mobile Ad-Hoc Networks (MANETs) are autonomous and decentralized wireless systems. Routing is a significant issue and challenge in ad hoc networks. There have been many routing protocols proposed for ad-hoc/MANET networks in multiple categories. There are two important categories for ad-hoc network routing algorithms: proactive (table driven) and reactive (on demand), and recently also Hybrid (combining both). Two examples of Reactive protocols are Ad hoc On-Demand Distance Vector or AODV and Temporary Ordering Routing Algorithm or TORA. Two examples of Proactive protocols are LSR/OLSR and Destination-Sequenced Distance-Vector Routing (DSDV).

Results show that AODV has maximum throughput under low traffic, that DSDV has maximum throughput under high traffic, and that as a network becomes dense OLSR, DSR and DSDV perform better in terms of Throughput than AODV and TORA.

In general, TORA performs well in dense networks in terms of packet delivery fraction but at the same time Normalized Routing load of TORA is maximum among all the protocols in both the networks. DSDV has least Normalized Routing load for both low and high traffic. Finally, OLSR and DSDV give the least Jitter and Average Delay in both low and high traffic networks.

SUMMARY OF THE INVENTION

The present embodiments may provide a short term protected path over an ad hoc and/or routed mesh network for specific high-volume data transmission from source to destination. The reserved path ensures that defined large volume data is transferred smoothly over the network, and the net effect on other smaller data items traversing the same ad hoc network at the same time is generally minor as alternative paths remain open.

According to an aspect of some embodiments of the present invention there is provided overlay apparatus for an ad-hoc/MESH communication network, the network comprising a plurality of nodes, at least some of which nodes are mobile with respect to other nodes, the nodes able to establish and abandon connections as they move with respect to one another, the nodes generally requiring relatively small bandwidth communications in order to generate and maintain an ad-hoc/MESH physical network of the nodes and the overlay apparatus, configured to reserve at least one assured protected communication path between a source node of a relatively large bandwidth communication and at least one destination node of the relatively large bandwidth communication, the reserved path being via at least one intervening node according to a current topology configuration of the connections of the ad hoc/MESH network.

The overlay apparatus may reside within one, some or each one of the physical network nodes.

The overlay apparatus may generally require and make use of a relatively small bandwidth communications in order to generate and maintain a physical and overlay network having a network node topology being parallel to a topology of the ad-hoc/MESH physical network.

The overlay apparatus may identify the nodes of the ad hoc/MESH network to form the assured protected path.

The overlay apparatus may prevent neighboring nodes not in the assured protected path from sending payload communications over any nodes of the assured protected path, until such assured protected path is not required anymore.

In embodiments, the network node connections are bi-directional for network control information, and the reserved path for relatively large data transfers is unidirectional.

In embodiments, connections reserved for the reserved path are bi-directional for network control information and unidirectional for payload data, such that only the large data transfer is permitted to flow between the source node and the destination node.

In embodiments, the establishing and abandoning of connections is carried out in a first underlay physical network supervision/routing layer and the overlay apparatus forms a second overlay network supervision/routing layer capable of overriding and/or manipulating control information and control behavior of certain nodes in the first underlay physical network supervision/routing layer.

The overlay apparatus may change the reserved path if the current configuration and topology changes, or in addition or in the alternative may reserve at least two paths in parallel for the respective relatively large communication.

The overlay apparatus may receive a solicited request or poll for relatively large data transfer requests or an unsolicited relatively large data transfer needing to be delivered to a destination in the network and may identify the relatively large bandwidth request from the polling or solicited or unsolicited request or the unsolicited data transfer.

The overlay apparatus may identify a plurality of requests for relatively large communications from different nodes and may place the requests in a queue. The queue may be arranged according to a predetermined priority or a priority policy or according to priority levels set by or for the users.

The overlay apparatus may identify a plurality of relatively large communications from different nodes and may reserve paths respectively for each relatively large communication.

The present embodiments further relate to the underlay physical network with the overlay apparatus as described herein, wherein the nodes could be any type of ad hoc/MESH network nodes, including for example terrestrial nodes, vehicular nodes, mobile nodes in general, maritime nodes, and airborne nodes or nodes carried by satellites in earth orbit.

In embodiments, the satellites carrying nodes are any one of low earth orbit, medium earth orbit, elliptical orbits, geostationary satellites and/or a combination of any of them, or a combination of any of them with non-satellite nodes.

In embodiments, at least one of the nodes is a gateway to other networks such as a gateway network operations center/ground station and/or any type of network control station with interfaces to other networks.

In embodiments, the relatively large communications comprise image data, the network using the overlay apparatus to route the image data from a satellite obtaining the image data to the gateway/ground station over the current configuration of the ad hoc network.

The overlay apparatus may determine available bandwidth in the ad hoc/MESH network and may set up respective reserved/assured protected paths according to the available bandwidth determined to be available.

According to a second aspect of the present invention there is provided an overlay method for an ad-hoc/MESH communication network, the network comprising a plurality of nodes, at least some of which nodes are mobile with respect to others of the nodes, the nodes configured to establish and abandon connections as they move with respect to one another, the connections generally carrying traffic of relatively small bandwidth for network control information, and/or shared capabilities for unidirectional or bi-directional data payload transfer, the overlay method comprising:

identifying relatively large communications requirements over the network or receiving transfer requests for the relatively large communications; and reserving at least one path over a current configuration of the connections of the ad hoc/MESH network for a respective one of the relatively large communications.

In embodiments, the reserving the path comprises identifying nodes of the ad hoc/MESH network to form the assured protected path.

The method may comprise preventing of neighboring nodes not in the path from sending other payload communications over the assured-protected-path-nodes, thereby keeping the assured protected path clear for the relatively large communication until the assured protected path is not required anymore.

In the method, the identifying may involve polling or receiving a solicited or unsolicited request for data transfer indicating a relatively large bandwidth or receiving unsolicited a large data transfer.

In the method, the connections are bi-directional for network control information, and the reserved path is unidirectional or wherein the reserved path is bi-directional wherein only the large data transfer is permitted to flow from the source node to the destination node.

In the method, the establishing and abandoning of connections is carried out in a first underlay network supervision/routing layer and the overlay apparatus forms a second overlay network supervision/routing layer capable of overriding and/or manipulating control information and control behavior of certain nodes in the first supervision/routing layer.

The method may comprise changing the reserved path if the current configuration changes.

The method may comprise reserving at least two paths in parallel for the respective relatively large communication.

The method may comprise identifying a plurality of relatively large communications from different nodes and reserving paths respectively for each relatively large communication.

The method may comprise identifying requests for a plurality of relatively large communications from different nodes and placing the requests in a queue.

The method may comprise ordering the requests in the queue according to a priority.

According to a third aspect of the present invention, there is provided a network server for an ad-hoc/MESH communication network, the network comprising a plurality of nodes, at least some of which nodes are mobile with respect to other nodes, the nodes establishing and abandoning connections as they move with respect to one another, the nodes generally requiring a relatively small bandwidth for communications and the server configured to identify a relatively large bandwidth communication for transfer over the network from a source node to a destination node via at least one other node according to a current topology configuration of the nodes and to reserve at least one assured protected communication path between the source and the destination nodes via the at least one other node.

The server may identify the nodes of the ad hoc/MESH network to form the assured protected path.

The server may prevent neighboring nodes not in the assured protected path from sending other data communications over the assured protected-path-nodes, thereby keeping the assured protected path clear for the relatively large bandwidth communication.

The server may receive a solicited request or poll for relatively large data transfer requests or an unsolicited relatively large data transfer and to identify the relatively large bandwidth request from the polling or solicited or unsolicited request or the unsolicited data transfer.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a schematic diagram showing a constellation of satellites in earth orbit, and indicating individual satellites forming nodes in a network according to the known art;

FIG. 2 is a simplified diagram showing throughput in an ad hoc network as a function of chain length and packet length according to the known art;

FIG. 5B is a simplified diagram showing an example of multipoint relays-MPR nodes selection among all network nodes in a network based on Optimized Link State routing protocol known as OLSR;

FIG. 5C is a simplified diagram showing an example of OLSR MPR and regular nodes network organization after MPR selection in a network based on OLSR ad-hoc routing protocol;

FIG. 5D is a simplified diagram showing OLSR optimization versus LSR of the flooding process versus LSR an example comparing the efficiency in terms of the number of required retransmissions;

FIG. 6 is a simplified diagram showing an ad hoc underlay network management layer enhanced with an overlay layer according to embodiments of the present invention;

DESCRIPTION OF SPECIFIC EMBODIMENTS OF THE INVENTION

Figure 3:
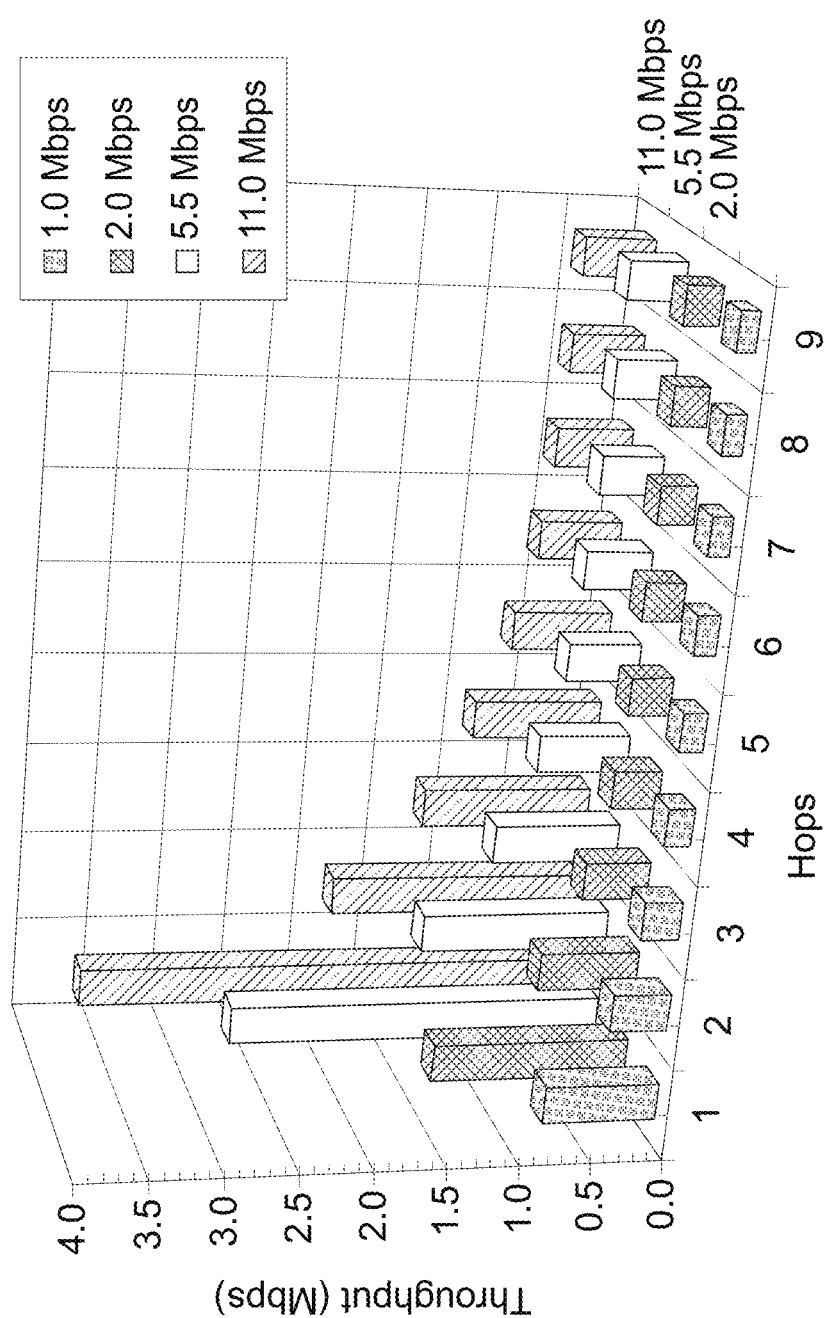
FIG. 3 is a simplified diagram showing the effects of chain length and data rate on overall ad-hoc network throughput according to the known art.

The present invention, in some embodiments thereof, relates to an ad hoc network.

Embodiments may provide an improved way of externally and temporarily manipulating ad-hoc network or mesh network routing protocols in order to allow large high-resolution images (photo or video) to be transferred in real-time or near real-time between the recording device and the destination where they are not directly visible, avoiding traffic bottlenecks along the way that could hinder the real-time high-resolution images to arrive from source to destination with multiple hops (one or more) along the way. The external routing protocol manipulation is initiated upon a request for images from a specific device on the ad-hoc network, and once such a high-resolution images (photo or video) transfer is completed, the routing protocol manipulation is reversed in order for the ad-hoc network to go back to normal operation.

An embodiment may provide an overlay network riding on top of the ad-hoc routed underlay network. The underlay ad-hoc network may run for example OLSR as a proactive routing protocol. In such an embodiment, the Ad-hoc network running on OLSR routing would not be aware at all of the overlay network running on top which may be present in every ad-hoc network node. In the embodiment the overlay layer present in each network node as well as in the terrestrial ground stations in the case of a satellite embodiment, and running in user stations behind some of the wireless MANET nodes would be responsible for receiving manipulation requests to be performed on those nodes in the path(s) of ad-hoc network nodes chosen by the overlay network management to serve the information flow between the source of the high definition images (photo or video), typically a camera mounted on a specific satellite, and the destination, typically a user behind the ground station terminal. In case of a wireless MANET the embodiment would be similar, were the source for example a camera or sensor behind a MANET node, and the destination a network user behind another MANET node. The manipulation may involve making changes in the routing tables kept in each node of the OLSR ad-hoc network, and masking and filtering all control messages issued by the OLSR protocol such as hello messages and topology floods that would interfere with the image transfer. After the overlay network in those manipulated nodes completes the message from the overlay network management, the manipulation is reversed, and the filtering and masking of messages stops. Thus the ad-hoc network is allowed to operate in the normal mode, for example OLSR. The "manipulation" method may vary based on the ad-hoc routing protocol utilized by the underlay ad-hoc network, or mesh routed network, and may entail enforcing a temporary artificially applied change of ad-hoc or routed mesh underlay network behavior.

The present embodiments thus relate to AD-HOC and/or MESH network routing being used to build and implement a bi-directional network between mobile units, or mobile units and a fixed base station, such as for example all the LEO satellites of a satellite constellation in a network among themselves as well as with the ground station(s). Given the nature of mobile networks and LEO satellites in particular, not all network nodes may be visible at all times. In the example of LEO, MEO and HEO satellites, they orbit the earth, and as such can only interconnect with the ground station during the period of time they are flying on top of the ground station and have a line of sight that enables them to establish a radio communication link for that period. Such a network may operate all the time, in the example of LEO/MEO/HEO satellite constellations, multiple satellites in various same or different orbits may circle the earth continuously, where for example it may take them typically between 84 to 127 minutes for a full orbit in the case of LEO satellites, depending on multiple factors. A LEO Satellite constellation for example may be utilized specifically for high resolution imaging, say either photo or video, and typically such LEO satellites record such images into memory within the satellite and only transmit such image within the short window of time, for example a few minutes while they are able to establish a radio communication link to the ground station. Such an imaging application is typically considered UNI-Directional, as imaging data is kept within the satellite internal memory until the unidirectional radio communication link from the LEO satellite in the direction of the Ground station is established, and the recorded images in the LEO satellite memory are downloaded to the ground station for distribution through the ground station network. This is in contrast with LEO/MEO/HEO satellite constellations being used to deliver let say Internet/broadband services to those areas visible to the satellite while orbiting the earth, In this case the satellite establishes bi-directional communications with network users on earth, but in addition, since it needs to allow such users to reach the terrestrial network, for example the Internet, which is only accessible through the ground-station, the satellite needs to transmit information and receive information from other LEO/MEO/HEO or GEO satellites and use them as relays to reach the ground station and vice-versa. Information from the ground-station may be relayed through various satellites to reach the specific LEO satellite that is currently positioned to deliver this information to the network user on earth visible from the satellite. Such applications are typically called Bi-Directional. It is noted that all satellite types may have bi-directional Telemetry radio communication capabilities at least for internal satellite operation purposes, but which are not generally utilized to transfer or receive user/application data. The present embodiments may deal with the latter, namely the network user and applications connectivity on ad-hoc/MANET mobile networks requiring large amounts of information to be transmitted over multiple hops in one direction from source to destination on demand.

In looking at the unidirectional LEO high resolution imaging application example described hereinabove, since a LEO satellite recording high resolution images (photo or video) can only download them when its orbit brings it over al ground station, typically every 80-130 minutes or so, images recorded are by nature not real-time. As described above, in the event the application requires real-time images (photo or video), bi-directional capabilities must be added to such imaging LEO satellites so they can transfer such images over one or more satellites acting as relays until the images reach the satellite that is currently visible from the ground station. For the satellite to download such content in near real-time, a slight delay is added by the need to relay the images through various satellites in order to reach the ground station, but this is minimal, perhaps less than a few seconds in comparison with the 80 minutes.

The present embodiments may provide a layer which carries out external and temporary manipulation of an ad-hoc network or mesh network routing protocols in order to allow large high-resolution images (photo or video) or a very large file or large amount of data to be transferred in real-time or near real-time between the source and destination. The data may be a high resolution photo or video from a camera in a LEO imaging satellite transferred to a destination which is typically behind the ground station. The transfer may be carried out at any time, including times when the source and destination are not directly visible and capable of communicating directly. The present embodiments are intended to avoid traffic bottlenecks along the way that could hinder the real-time high-resolution images that arrive from source to destination with multiple hops (one or more) along the way. The external routing protocol manipulation is initiated upon a request for the transfer of high resolution images from a specific device on the ad-hoc network, and once such high-resolution images (photo or video) transfer is completed, and the images have reached the destination, the routing protocol manipulation is reversed in order for the ad-hoc or mesh network to go back to normal operation. Embodiments may achieve the result using parasitic agents residing in each ad-hoc or mesh network node and ground station, creating a virtual overlay network between them on top of the underlay physical ad-hoc or mesh routed network. Such parasitic overlay network agents, when requested (on-demand) may perform the required manipulations to generate a clear and free path between source and destination for the data to pass through. When notified that transfer has been completed, the manipulation performed is reversed so that the network may continue to operate in normal mode. Such manipulations typically entail filtering and spoofing out any communication requests that may interfere with the fast pass-through movement of information from source to destination, as well as manipulating routing tables in such a way that for the duration of the information transfer the only activity in the path between source and destination is the large information data transfer, as well as the low data rate control information exchange between the routing nodes and the parasitic agents required in order to manage the overlay and execute the transfer. Once the parasitic agents along the path between source and destination receive acknowledgement that the transfer has been completed, they may reverse the manipulation in each node back to normal operation, as explained above. Such parasitic nodes can support, upon request, multiple paths for parallel or redundant transmission, and may allow the ad-hoc network to build an alternate path, recovering and continuing transmission over a different path in the event one or more nodes along the path lose connectivity.

As discussed in the background, if we were to use regular ad-hoc network routing for high data rate, or high data volume, such as real-time image transfer, then we would meet the issues of rapid performance degradation dependent on bandwidth and number of hops. Consequently, it would not be possible to guarantee real time imaging information delivery, and there is no general way to tune the network for such transfer.

An overlay apparatus, as described above, is therefore provided for the ad-hoc communication network. The nodes generally carry relatively small bandwidth communications and the overlay apparatus reserves a fixed path over a current configuration of the ad hoc connections when a relatively large bandwidth communication appears so that the relatively large bandwidth communication may pass over the network smoothly over the reserved path without causing congestion.

The overlay/override routing mechanism may keep track of the network topology. Then, when a request to transfer imaging from a specific satellite is made, the overlay routing mechanism calculates a path or paths, and overrides the standard random weight based ad-hoc routing in the satellites with a unidirectional path from the target satellite to the ground station. The path may be a dedicated path, isolated from all other satellites or data transport in the network, and ensures that in the direction from the target satellite towards the ground station and through all the satellite or other hops in between is kept clear from other activities. There is thus formed a unidirectional highway ensuring the delivery of the imaging and lasting for the duration of the delivery. As soon as the pathway is no longer required the same path reverts to normal mode and becomes part of the ad hoc network again. It is noted that the direction from the ground station to the satellite may continue to operate in the usual way, so that commands from ground station(s) can reach any target satellite at any time.

Due to the nature of LEO satellites, planning and timing for the path in consideration of the amount of data and in consideration of the data rate that is otherwise utilized for inter-satellite communications and in consideration of the data rate needed for satellite to ground communications is essential in order to ensure that the images or video reaches the ground station in time. The general conditions of the ad hoc network may dictate how the data needs to continue through the next satellite capable of transmitting to the ground station.

There may be multiple ground stations and multiple such paths operating in parallel as long as one does not interfere with the other. The multiple paths may be provided to work in parallel for a single data transfer, or different dedicated paths may be supplied for two or more satellites transferring images at the same time. Such coordination between different dedicated paths is also a task of the override routing mechanism of the present embodiments, and the override mechanism may be able to tell the ground station making a request requiring data capacity whether the requests can be met or whether they would need to interrupt a currently assigned data highway in order to initiate the new request. The override mechanism is configured to make suitable path calculations and to assign or not assign bandwidth based on the path calculations performed.

The override mechanism may be preconfigured to allow only a single target satellite to transmit imaging at any specific time, or with any other suitable constraints based on the number of satellites and available bandwidth in the ad hoc network.

A network term utilized to identify large amounts of data in a single flow, such as a high-resolution image in a network, in contrast to large numbers of smaller flows, is the term "elephant flow".

In computer networking, an elephant flow is a relatively large (in total bytes) continuous flow set up by a TCP (or other protocol) flow measured over a network link. Elephant flows, though not numerous, can occupy a disproportionate share of the total bandwidth over a period of time.

Elephant network flows are in one direction, source to destination, and references to image and video data herein may be read as relating to elephant flows in general.

The present embodiments relate to ad-hoc networks and MANETs in particular that need to handle a high priority elephant flow (in a specific single direction), and given the nature of the network, such elephant flows go through multiple nodes or hops that relay the message forward to the next node in the path until the complete elephant flow reaches its destination. The present embodiments provide a solution for the elephant flow to reach its destination by becoming the highest priority flow on the network.

The present embodiments particularly relate to LEO imaging satellites, as a very specific use case where the need is acute and there is currently no solution for real-time imaging, however the solution is broadly applicable to elephant flows in any kind of multi-hop network.

Particular use cases are provided as follows:
1. LEO Imaging Satellite constellations requiring real time data delivery. Current LEO imaging satellites have no satellite to satellite connectivity, just to the ground station. Thus for the purposes of the present embodiments these satellites may be modified to handle satellite to satellite communications.
2. LEO broadband satellite constellations which are required to handle elephant flows that may create congestion through the hops. These satellites have by definition Satellite-to-satellite communication capabilities, and it is possible that such satellites may be used also for imaging applications.
3. Ad-Hoc or MESH wireless networks solely based on wireless radio communications between them for example self-forming peer-to-peer networks between cellular phones, or other mobile devices such as in MANETS, requiring handling of elephant flows that may create congestion through the hops. The ad-hoc networks could be vehicular ad-hoc networks.

The ad hoc network has no central management but the overlay unimanet virtual network may be centrally managed from a base station.

The present embodiments may work to apply order on elephant network flows in a self-organized ad hoc network that does not intrinsically have central network management.

Requests for elephant flows are made, according to the present embodiments, to the Unimanet Server which queues the requests, calculates the path or paths if redundant transfer is required and sends the command to all Unimanet parasitic proxies in the path to manipulate the respective nodes clear the path and monitor elephant flow delivery from source to destination. Once a particular elephant flow is completed the reverse command may be sent to all the respective Unimanet parasitic proxies to reverse the path manipulation to return to normal ad hoc network operation.

The relatively large flows or elephant flows are defined by their size in relation to the general flow in the network. At the WIDE network they found elephant flows were only 4.7% of all flows but occupied 41.3% of all data transmitted during the time period.

Some research shows that elephant flows may be highly correlated with traffic spikes and other elephant flows. Elephant flows have varying definitions proposed by researchers including flows that occupy greater than 1% of total traffic in a time period. Another definition is obtained by measuring the duration of the flow, and looking at flows whose size is greater than the mean plus three standard deviations of traffic during the time period. In embodiments, a real time definition may be based on carrying out the same or similar experimentation on the specific network in question and then setting a threshold.

For purposes of better understanding some embodiments of the present invention, as illustrated in FIGS. 6-12 of the drawings, reference is first made to the construction and operation of an existing ad hoc network as illustrated in FIGS. 1-5E.

FIG. 1 shows the earth surrounded by a constellation of low earth orbit (LEO) satellites, all connected together as nodes in an ad hoc network. The nodes in the ad hoc network may form a path to and from ground. Images may be relayed over the network but may have to pass various satellites in a multi-node path to reach the one satellite that can transmit to ground, and variable length paths and different delays at each node may be experienced. The data may change path as the state of the network changes, and FIG. 2 illustrates how throughput in general varies with number of hops. FIG. 3 shows the disruption in greater detail, and shows how the effect is greater the larger the data size. Specifically, data sizes of 1 Mb/s, 2 Mb/s, 5.5 Mb/s and 11 Mb/s pass between 1 and 9 hops, and it is clear that for the larger data sizes the throughput at above 5 hops is not much greater than for the smaller data sizes.

Figure 4:
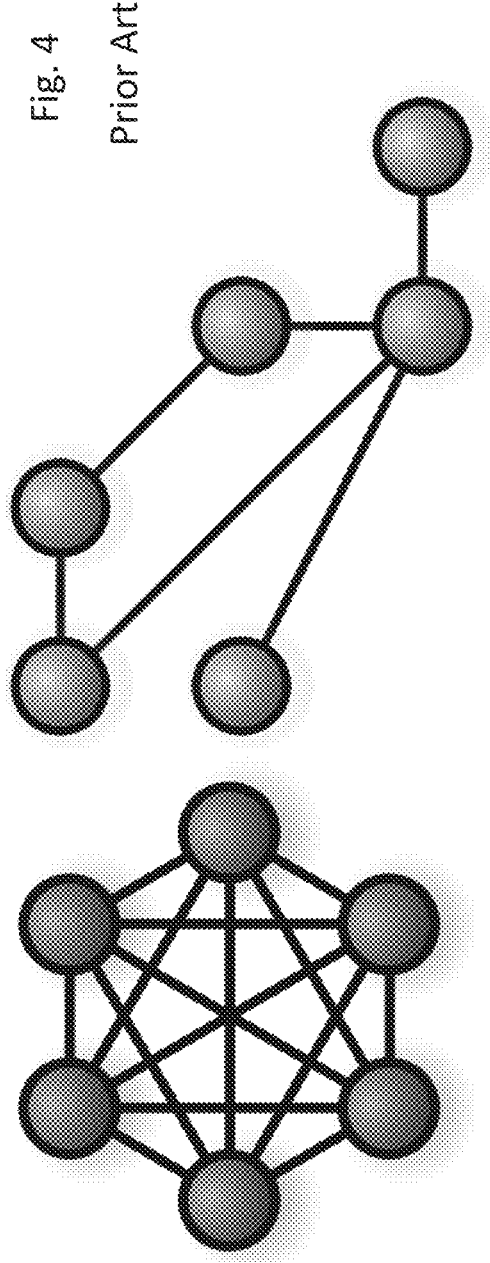
FIG. 4 is a simplified diagram showing two ad-hoc and/or mesh network topologies according to the known art.

Ad hoc networks are generally self-forming, and FIG. 4 shows two different configurations for a six node network, depending on the distribution of the nodes. FIGS. 5A-5E shows a configuration for a circularly confined eight-node network.

Figure 5A:
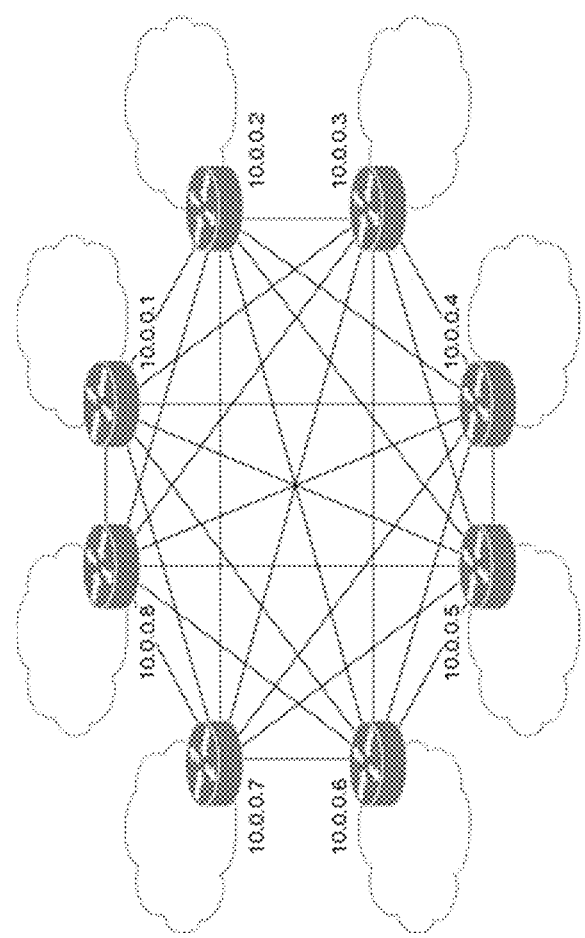
FIG. 5A is a simplified diagram showing a routed mesh network according to the known art.

FIG. 5A is a simplified diagram showing a routed mesh network according to the known art.

FIG. 5B is a simplified diagram showing an example of multipoint relays-MPR nodes selection among all network nodes in a network based on Optimized Link State routing protocol known as OLSR.

FIG. 5C is a simplified diagram showing an example of OLSR MPR and regular nodes network organization after MPR selection in a network based on OLSR ad-hoc routing protocol.

FIG. 5D is a simplified diagram showing OLSR optimization versus LSR of the flooding process versus LSR an example comparing the efficiency in terms of the number of required retransmissions. Optimized Link State routing protocol is known as OLSR and regular Link State routing protocol known as LSR. Since LSR and OLSR require the topology database to be synchronized across all the network nodes, MPR nodes flood topology data often enough across the ad-hoc network to make sure that the topology database in each node does not remain unsynchronized for extended periods of time.

Figure 5E:
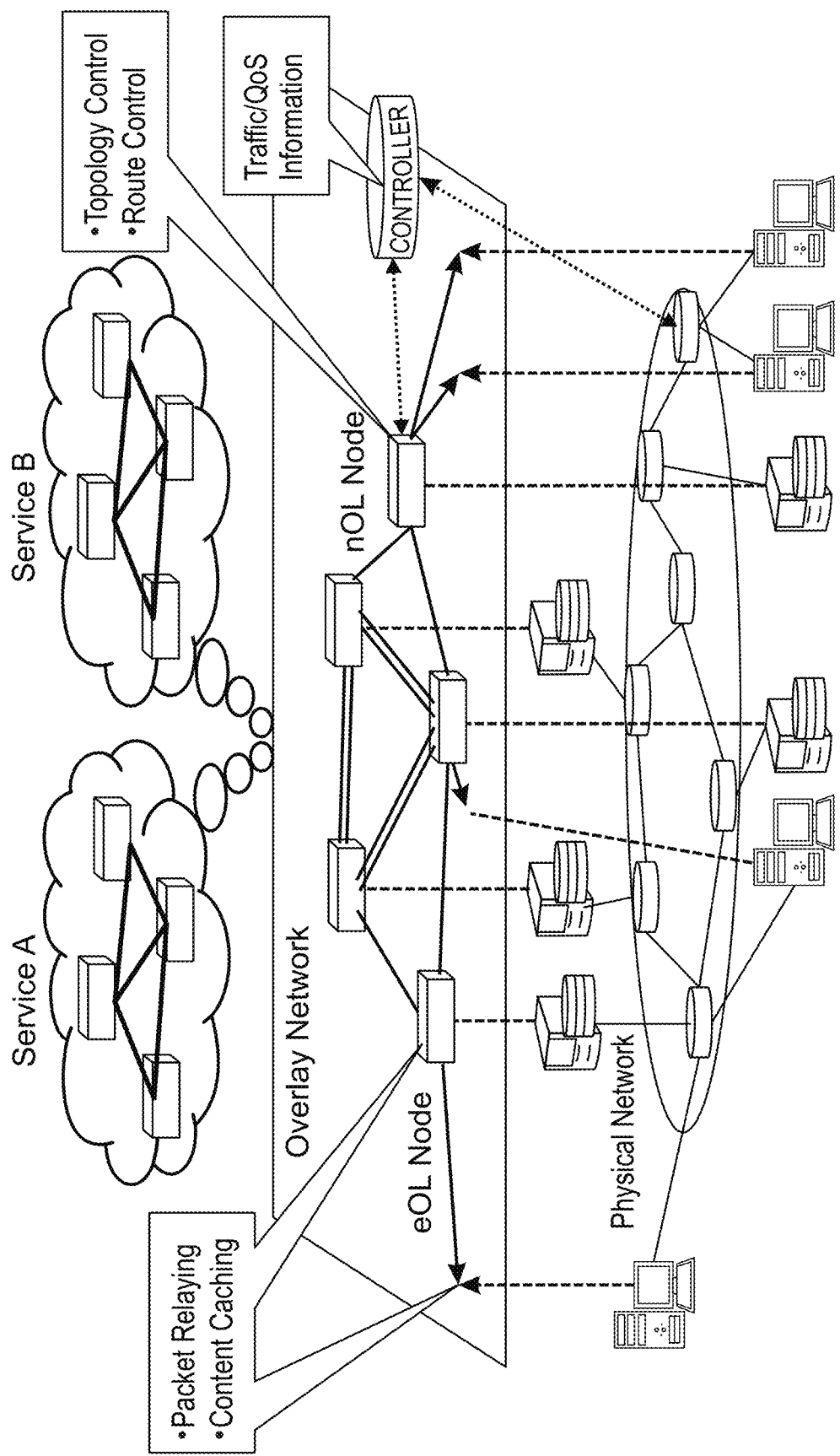
FIG. 5E shows a physical network with an overlay network

FIG. 5E shows a physical network with an overlay network. The overlay network is built on top of a physical network and the nodes are connected by paths which exist virtually over physical entities in the underlying network. Thus peer to peer networks operating on the internet are in the form of an overlay network. The overlay allows levels of network abstraction to use the underlying physical network in different ways.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 6 illustrates an overlay apparatus 100 for an ad-hoc communication network such as that in FIGS. 4 and 5A-E. The network itself is any of the networks in FIGS. 4 and 5A-E and includes multiple nodes, at least some of which are mobile. The nodes establish and abandon connections as they move with respect to one another so that a connection is made between nodes as they come into range and is abandoned as they move out of range, and as long as all nodes can see at least some other nodes a network exists. The overlay apparatus 100 may distinguish relatively large data communications that need to be sent over the network. That is to say the network has a typical routine load of control data that goes back and forth, and every now and then large data needs to be transmitted. The overlay apparatus identifies the large data transfers as they emerge and finds out where they need to go. Then the overlay network reserves a path over the current ad hoc network configuration for the large communication to pass. The reserved path may be the shortest path to the destination or it may be made up of some optimization of short length and high capacity nodes, or designated connecting nodes may be used. It is often the case in an ad hoc network that different nodes have different capacities. Furthermore capacities may vary dynamically due to intervening conditions such as changing distance.

The overlay 100 lies over ad hoc network management layer 102, which manages the ad hoc connections of the network. The network management layer 102 determines what nodes are linked together. That is to say the network management layers keeps an up to date map of the current network configuration, so that data can be routed from any source node to any destination.

The overlay 100 may reserve the path by identifying nodes that form the path, and may inform the neighboring nodes which do not form part of the reserved path, that their neighbors which do form the path are not available for communication. Thus the overlay layer may reserve the path simply by overriding, without changing anything in the network management layer 102, which continues to carry out its task of network supervision.

In general connections in the ad hoc network are bi-directional, so that when two nodes are connected, data may path in either direction. The reserved path however is unidirectional, as the path is reserved for specific data going from a specific source to a specific destination. The path reservation may include bandwidth generally retained for the opposite direction.

As discussed, the configuration of the ad hoc network may change in real time, including over the duration of the large data transfer for which the path was reserved. The overlay 100 may determine from the network management layer that a relevant change in the network configuration has occurred and may change the reserved path accordingly, rather than continue to send the data over a path that has ceased to exist or is no longer optimal.

In many cases there may be more than one path over the ad hoc network from the source node to the destination node. The overlay 100 may reserve two or more paths in parallel if necessary. Likewise, the overlay may reserve all or most of the bandwidth of the connection for the direction in which the communication is to travel, at the expense of the other direction.

Likewise, in many cases, more than one node at the same time may require to transmit a large data communication. The overlay layer may identify multiple relatively large communications from different nodes and may reserve paths respectively for each relatively large communication. Furthermore, the overlay may take into account the capacity of the network and limit the number of large data transfers taking place at any given time, making at least one of the data transfers wait until other reserved paths have been relinquished. The overall result, even for the data transfer that is delayed, may often be that the transfer is completed sooner than if congestion is allowed to build up on the network.

Figure 7:
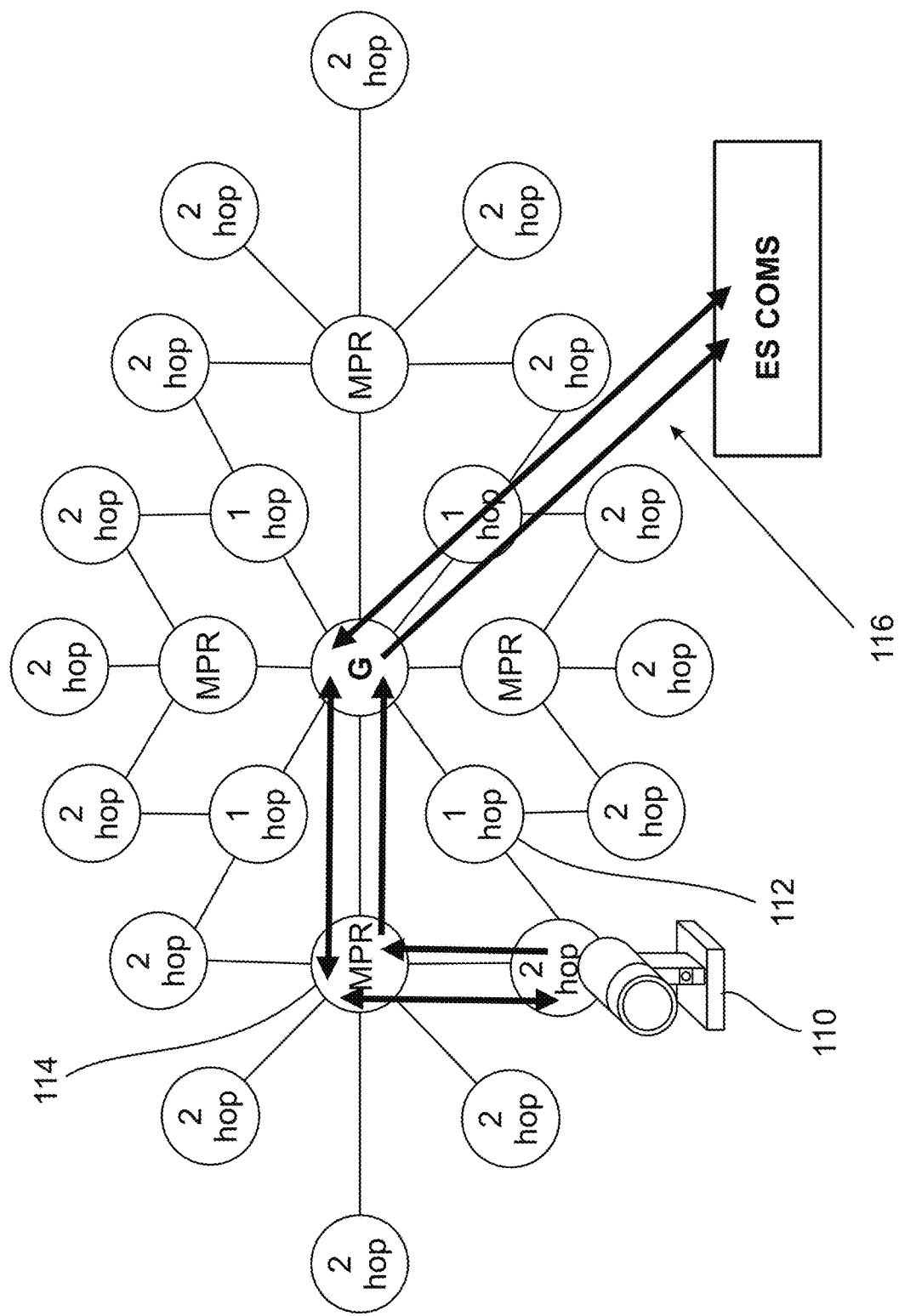
FIG. 7 is a simplified diagram showing a fixed path reserved through an ad hoc network for transferring one or more images from a camera according to an embodiment of the present invention.

Reference is now made to FIG. 7, which shows the nodes as satellites in orbit and a ground station. The satellites may be in low earth orbit LEO, and one of the satellites G may be located over the ground node communications GS NODE.

One particular satellite 110 may take an image of the earth's surface, which is needed in real time. The network management layer may poll the satellites for data to be transferred to which satellite 110 responds that it has an image to transfer. When a large data transfer is indicated from the polling, the overlay gets involved because a high resolution image is too large for the standard traffic that the ad hoc network is designed for. In the case as illustrated, satellite 110 is two hops away from the satellite G above the ground station, and there are actually two routes to the satellite G, one via satellite 112 and the other via satellite 114. Both routes are the same length, but satellite 114, selected as a multi-point relay (MPR), provides a preferred link. The selection process for the MPR is discussed hereinbelow in respect of FIG. 11. Thus the overlay layer reserves a path from satellite 110, through MPR satellite 114 to satellite G, and from G to the ground station GS NODE. The path, indicated by arrow 116, may be reserved by telling surrounding nodes that the nodes concerned have no available bandwidth in the given direction, or by telling them that no connection is available.

The polling and transfer may be carried out during a single LEO to Earth station download window.

In embodiments, the path reservation may be based on a window size estimation. The window size may be for one or for multiple images.

A LEO satellite system according to the present embodiments may thus generally provide a large Scale LEO Imaging Satellite Network with high-Speed Image Downloads (IDL), say of 500 Mbps-1 Gbps Data Rate using the present embodiments with path reservation. The Ground-Station (GS) to LEO Satellite Node (LEOS) part of the link may include S-Band Control Info & Telemetry (CIT) and Low Data Rate Bi-Directional and Ka-Band 1 Gbps Unidirectional from LEOS to GS.

The satellite LEOS-To-LEOS links may include two independent Microwave links to two adjacent LEO satellites, and may serve both unidirectional High-Data-Rate Relay from LEOS source to GS (IDL) and low data rate bidirectional (CIT) links.

The network may incorporate dynamic self-healing, for example using steerable antennas for path selection. In a general LEO Satellite constellation there may be an GS to LEOS window every 84 to 127 min (time window may vary outside the specified range and is influenced by a number of factors in a LEO constellation) and may be in view for a few minutes, corresponding to the time available to download securely images from any single satellite in the LEOS network in real-time. For the unidirectional IDL link, the number of hops is dynamic, there is self-healing which may be carried out on the fly, and there are generally dual paths for redundancy.

The present embodiments may provide a LEO Imaging Satellite Ad-Hoc Network which is an Ad-Hoc Network with Predictive & Self-Organizing Path Calculation.

Now, the Optimized Link State Routing protocol (OLSR) is a routing protocol that is optimized for mobile/wireless ad-hoc networks. OLSR is a proactive link-state routing protocol that floods a neighbor topology table to all nodes in the network which then compute optimal forwarding paths locally.

OLSR has less average end to end delay than the other schemes listed hereinabove. The OLSR implementation is more user-friendly, and is a flat routing protocol, thus not requiring central administrative system to handle its routing process. OLSR protocol suitability increases in ad hoc networks with rapid changes of source and destination pairs. OLSR protocol does not require a reliable link for control messages, since the messages are sent periodically and the delivery does not have to be sequential. The OLSR routing protocol offers simplicity in using interfaces, it is easy to integrate in existing operating systems, without changing the format of the header of the IP messages. The protocol only interacts with the host's Routing Table. Finally the OLSR protocol is well suited for applications which do not allow long delays in the transmission of data packets.

On the other hand OLSR needs more time re-discovering a broken link. The OLSR protocol periodically sends updated topology information throughout the entire network, and OLSR requires processing power to discover an alternate route.

Now in a Classical Ad-Hoc Network there is Self-Forming and Self-Healing. There is no Single Point Of Failure, no Central Management, and MPRs form a routing backbone. Other nodes act as hosts and as the nodes move, topological relationships change, routes change accordingly and the backbone shape and composition changes.

Now considering the present embodiments, there is a built-in gateway in each LEOS for Point-to-Point Link with the ground station GS, which may be S-Band for 2-Way, but of course the Image transfer is only one-way. A classical Ad-Hoc Bi-Directional Network provides low Data Rate information for control.

An image source node receives a poll request via the control system. The poll message may originate from the node that is currently flying over the ground station.

The control system is used to override the routing relay to provide a unidirectional minimum hops image transfer path through the current node flying over the ground station. The image is stored in memory and transferred through a built in LEOS-EC gateway in each LEOS along the path. The poll and subsequent image transfer may be executed during a single LEOS-EC download window.

An option for a single or multiple transfer of images may be provided by making a window size estimation based on the intended number of images.

An analogy for the reserved pathway of the present embodiments is a four lane highway having two lanes in each direction and where the lane directions of two of the lanes are reversed to provide a four-lane single direction highway to empty the stadium after a football match or other event ends.

The ground station gateway implements an OSLR Ad-Hoc node in order to be part of the Manet Network as well and may carry out tasks including discovery of devices, topological and location management, alarm management, performance management, network element configuration, network element information gathering, path computation and override, and reports.

Figure 8:
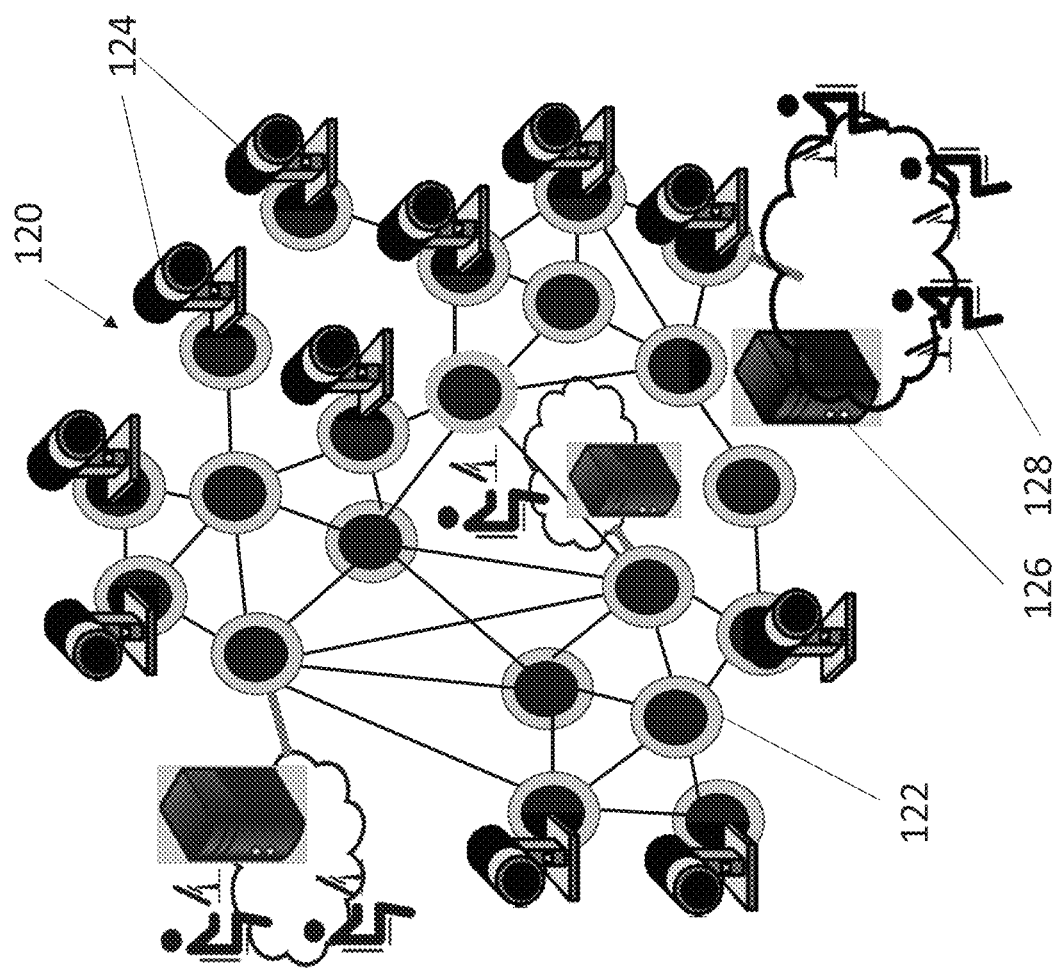
FIG. 8 is a simplified diagram showing a communication subsystem for LEO satellites according to an embodiment of the present invention.

Also implemented may be NBI Optimized Link State Routing Protocol, which may be proactive & table-driven, or may use link state routing, in which each node expands a spanning tree, or in which each node can obtain the whole network topology. Reference is now made to FIG. 8 which shows an Ad-Hoc/Manet or Mesh network 120 whose nodes 122 have a UniMANET Add-On Overlay that is part of a parasitic proxy. Video or imaging cameras 124 typically use very low data rate control/requests to device and high data rate to transfer images from the device to destination.

A UniMANET Overlay Network and Proxy Management Server 126 performs path computation and optimization, as well as Video/Imaging Camera or sensor/IoT/M2M Device control/payload request management. The UniMANET Server 126 is connected to both the Ad-Hoc/MANET or Mesh Network Nodes and the UniMANET Add-On Overlay Parasitic Proxy, as well as local network users 128.

Network users 128 behind the Ad-Hoc/Manet or Mesh Network Node may make control/payload requests to specific devices in the network.

Figure 9:
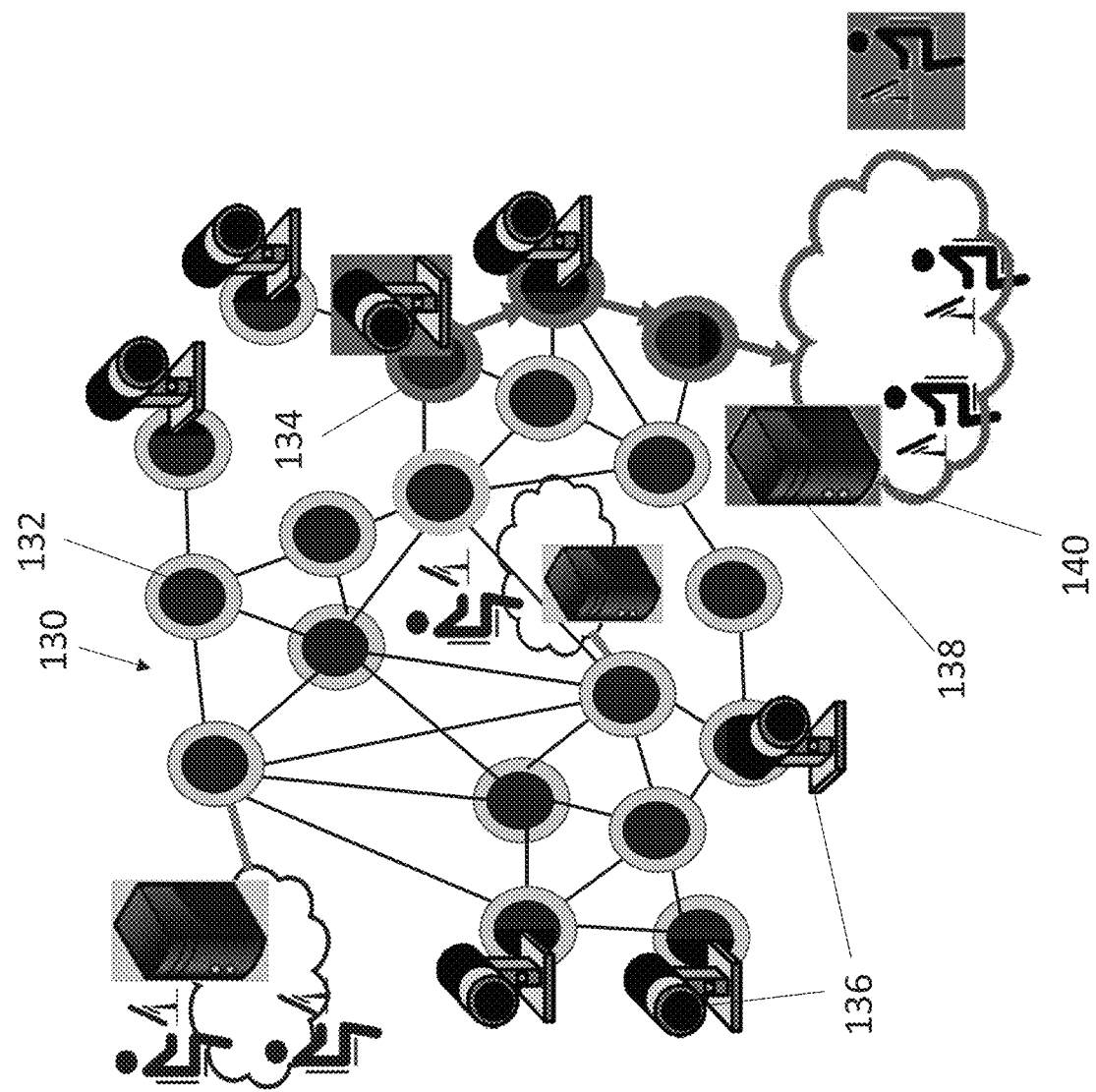
FIG. 9 is a simplified diagram showing an ad hoc network of LEO satellites according to an embodiment of the present invention.

Reference is now made to FIG. 9, which shows Ad-Hoc/Manet or Mesh Network 130 having network nodes 132 that include a UniMANET Add-On Overlay Parasitic Proxy in Monitoring Mode. Nodes 134 are Ad-Hoc/Manet or Mesh Network Nodes with a UniMANET Add-On Overlay Parasitic Proxy in UniTransfer Mode.

Video/Imaging Camera, Sensor or IoT/M2M Devices 136 transmit payload to a destination.

Figure 10:
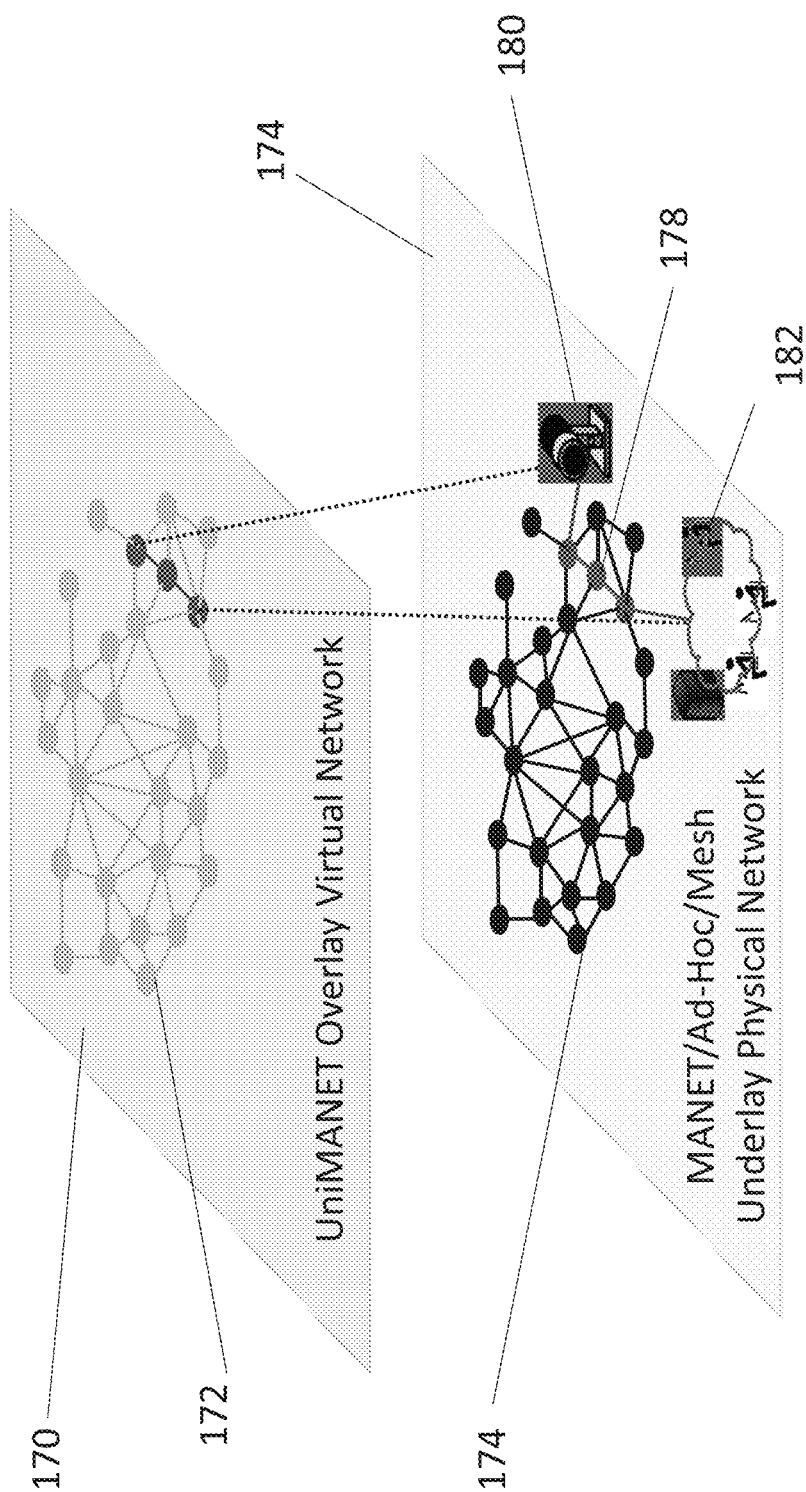
FIG. 10 is a simplified diagram showing a virtual UniManet overlay network with a Manet or Ad-Hoc or mesh physical underlay network.

A UniMANET Overlay Network and Proxy Management Server 138 manages payload delivery to a requesting user 140 behind the local network. The UniMANET server works in concert with all UniMANET Add-On Overlay Parasitic Proxies, and is also connected to the local network where the requesting network user 140 resides. Network user 140 is connected to the local network behind the Ad-Hoc/Manet or Mesh Network Node that made a request for payload from a specific Video/Imaging Camera, Sensor or IoT/M2M Device behind any node in the network FIG. 10 is a simplified schematic diagram showing the overlay and physical network as two separate layers. A UniManet Overlay virtual network 170 comprises nodes 172 which monitor physical nodes 174 of the physical underlay network 176 to set up path 178 from image source 180 to destination 182.

Figure 11:
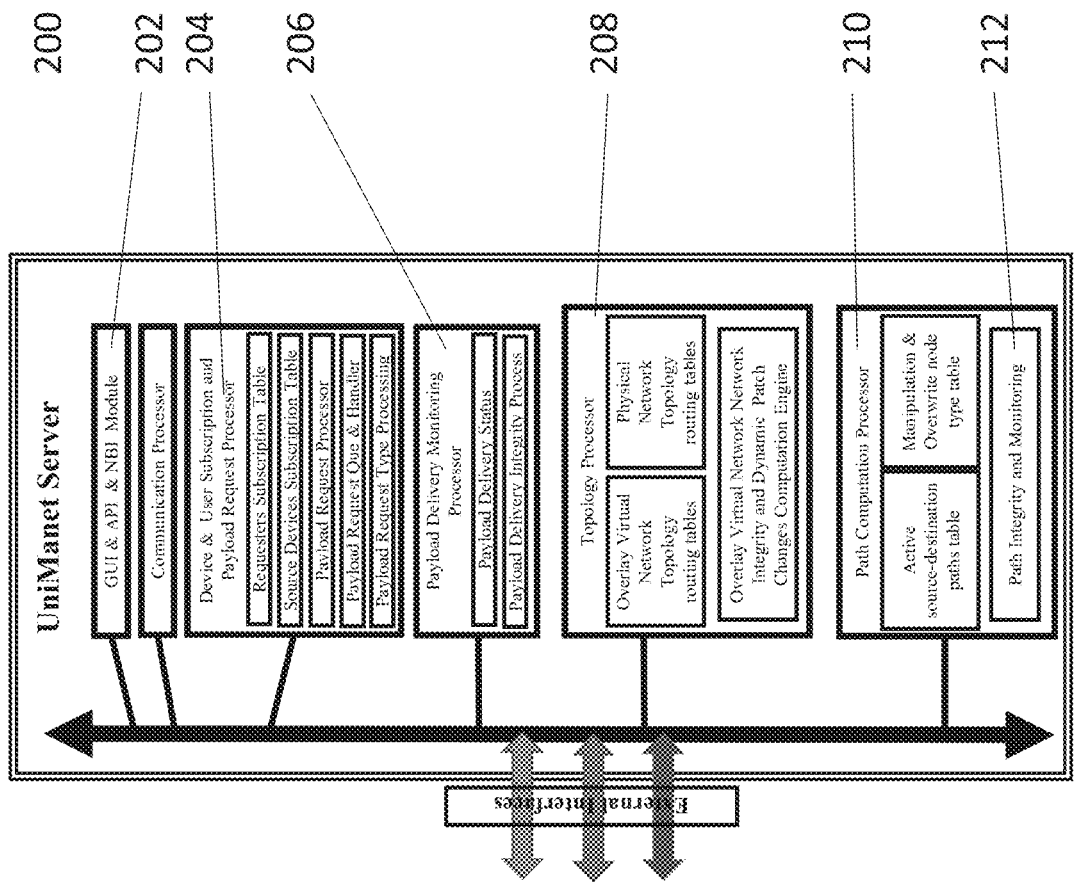
FIG. 11 is a simplified block diagram showing a UniManet server according to embodiments of the present invention.

Reference is now made to FIG. 11, which shows a UniManet Server 200, which is responsible for receiving all Elephant Flow requests, subsequently processing those requests and ensuring their execution. The term "elephant flow" is used to refer to flows having large bandwidth requirements as discussed above. Requests may come from the overlay UniManet proxy that may identify relatively large communications originating from the physical network at the node it resides on, or requests may come from users behind another node for example a fixed ad-hoc network node with gateway functionality to terrestrial networks such as a satellite ground station. Requests sent to the UniManet Server(s) may result in the reservation of one or multiple paths respectively for each elephant flow or large data transfer flow. The UniManet Server is aware of the entire network topology and all currently active elephant flows for which protected paths have been reserved. After receiving elephant flow requests, the UniManet Server manages elephant flow transfers, calculates an independent path and identifies the nodes that form that path, and sends the overlay UniManet Parasitic Proxies on those nodes a command to reserve the path to be protected for the requested elephant flow. The UniManet Server monitors the elephant flow transfer until completion, performing path modifications if and when necessary. Upon completion, the UniManet Server sends the overlay UniManet Parasitic Proxies on the path nodes a command to reverse the previously performed manipulation and return those nodes in the path to normal ad-hoc network operation.

In order to perform the above-mentioned tasks, the UniManet Server 200 described in FIG. 11 may have the following SW subsystems:

GUI & API & NBI Module 202 is a subsystem responsible for interfacing the UniManet Server with all external entities such as Users on the network, as well as UniManet Parasitic Proxies and all UniManet system elements.

Device & User Subscription and Payload Request Processor 204 is a subsystem responsible for processing all Elephant Flow transfer requests, after first verifying and authenticating the requesting party. Subsystem 204 verifies the subscribers and authorizes the Elephant Flow request, and may use any of multiple subscription and authentication method. Once the request has been approved for execution, SW subsystem 204 may use the other respective SW subsystems within the UniManet Server to process the Elephant Flow request, for example using Path Computation Processor 210, discussed in greater detail below, to return the best available path or path(s) depending on the request requirements for single, redundant or multiple paths, and may send the Elephant Flow Start Transfer Command to all the UniManet Proxies along the reserved and protected path or paths depending on the nature of the request. The Elephant Flow Start Transfer Command may also include indications as to the type of manipulation required to be performed by the UniManet Proxies along the path.

Payload Delivery Monitoring Processor 206 is now considered. Once the Elephant Flow request has been processed, SW subsystem 206 is responsible for monitoring the successful delivery of the Elephant Flow from source to destination, and alerting other subsystems as necessary if there are issues that require resolution in order to complete the transfer. Once completed, SW Subsystem 206 may be responsible for sending the reverse command to the appropriate UniManet Proxies in the reserved path. SW subsystem 206 may work together with the Path Integrity and Monitoring SW subsystem 212 discussed in greater detail below in order to perform its task.

Topology Processor 208 may keep track and perform updates of both the physical underlay ad-hoc network topology and the virtual UniManet overlay network and all UniManet Proxies. SW subsystem 208 makes topology information available to all UniManet Servers SW subsystems. In order to perform this function subsystem 208 exchanges control information with all the UniManet Proxies in the network. The topology processor 208 may also be aware of the type of Ad-Hoc/Mesh routing protocol utilized by the underlay network, and may provide this information also to the other SW subsystems.

Path Computation Processor 210 may keep track of all active elephant flows and may compute the desired reserved paths according to requests processed by the Payload Request Processor 204. The path computation processor may also be activated in the event there are changes along the reserved paths The Path Integrity and Monitoring subsystem 212 monitors the reserved paths and their integrity, for example if, due to mobility or interference, some of the communication links experience disconnections or very high error rate, and it then notifies the respective SW modules if changes along the paths are required. Subsystem 212 may be set to monitor communication link quality and provide this information to the path computation processor for path decisions.

Figure 12:
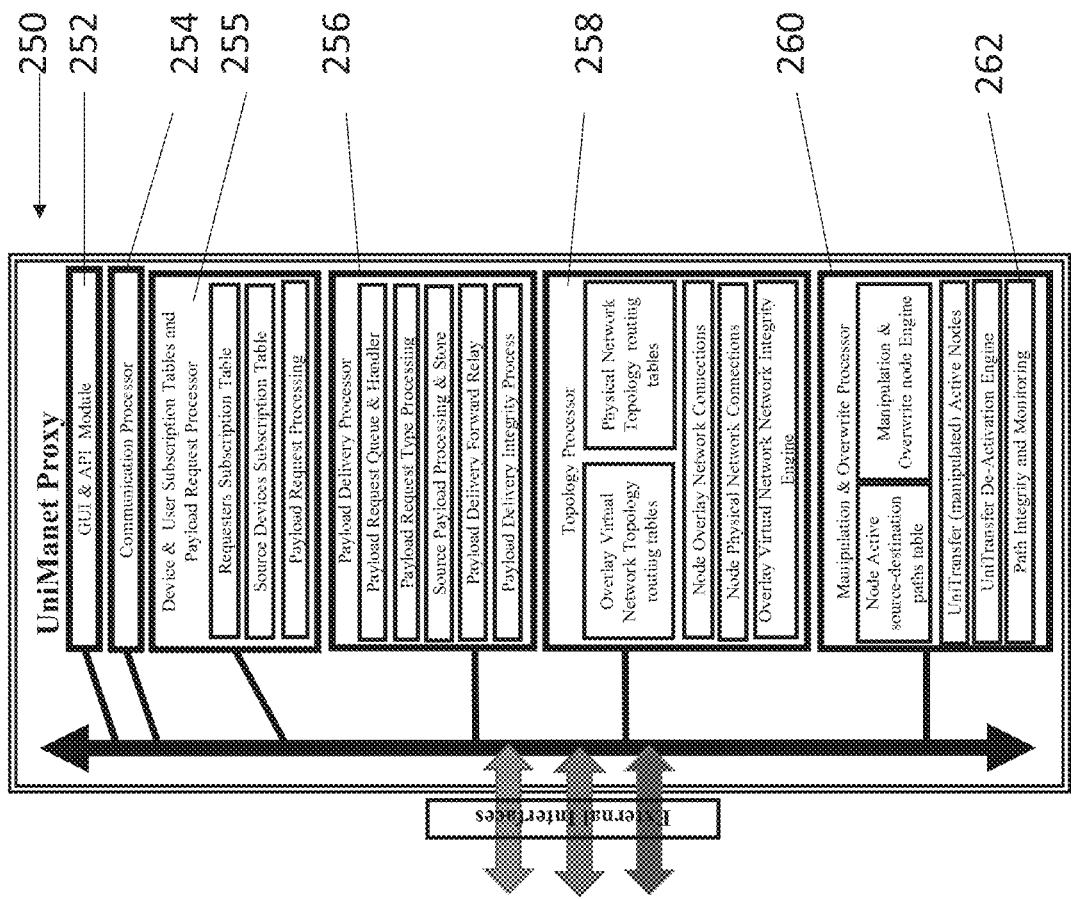
FIG. 12 is a simplified diagram showing a UniManet proxy according to embodiments of the present invention.

Reference is now made to FIG. 12, which is a simplified diagram illustrating a UniMANET Add-On Overlay Virtual Network Parasitic Proxy 250, which resides in each underlay physical network node in the Ad-Hoc/Mesh network on top of respective ad-hoc/mesh routing protocol modules. The routing protocol modules may not be aware of the presence of the overlay modules in each or each respective network node. When there are no elephant flow transfer requests on the overlay network the ad-hoc/mesh network operates using the ad-hoc/mesh routing protocols in each node as per prior-art Ad-Hoc/Manet or Mesh Network Node, and the UniMANET Add-On Overlay Virtual Network Parasitic Proxies do not interfere with such normal operations.

The UniMANET Add-On Overlay Virtual Network Parasitic Proxy on top of the underlay physical network interconnects all UniManet Parasitic Proxies with each other and with the UniManet Servers and other UniManet elements in the Overlay network over the underlay physical network. The overlay network exists solely for the purpose of receiving, coordinating, monitoring and executing elephant flow transfer requests.

UniMANET proxies read topology, available network paths to UniManet Servers and other relevant parameters from the Ad-Hoc/Manet or Mesh Network Node routing/switching tables as well as identities of Video/Imaging Camera, Sensor or IoT/M2M Devices connected to the network node that may generate elephant flows. In addition, the proxies may communicate network control information to the UniMANET servers on a regular basis and every time one of the overlay UniManet Parasitic Proxies detect a topology or device change, the change may be recorded in any of the underlay physical network nodes. UniMANET Servers use the change information in order to keep track in real-time of the network node and Overlay Virtual Network topology, network node identities as well as target elephant flow payload device identities behind each network node UniMANET Add-On Overlay Virtual Network Parasitic Proxies may modify the physical network behavior of the Ad-Hoc/Manet or Mesh Network nodes upon receiving the UniTransfer Activate command from the UniMANET Server, overwriting Ad-Hoc/Manet or Mesh Network Node normal Routing/Switching tables and may perform other filtering tasks as necessary in order to ensure the node acts in UniTransfer node so that the only activity performed by the node is to relay payload to the next node in the optimal path defined by the UniMANET Server through all the nodes required to reach the destination. At times there may be multiple physical networks due to the nodes physical behavior modification by the UniMANET parasitic proxies.

Virtual overlay network UniManet Parasitic Proxies 250 are responsible for manipulations on their respective node affecting the physical underlay ad-hoc/mesh network behavior to reserve and protect the path required for a specific elephant flow transfer, the reversal of such manipulations when the elephant flow transfer is completed, and regular communication with other UniManet Proxies and UniManet servers to receive control commands and execute the commands by sending control information, as well as proactively sending control information to all UniManet servers, proxies, and elements in the overlay network to keep the UniManet network operational and ready to receive, process and execute elephant flow requests.

GUI & API Module 252 is responsible for interfacing the UniManet Proxy with all external entities on the network such as other UniManet Parasitic Proxies, UniManet Server and all UniManet system elements. Communication Processor 254 may be responsible for all virtual overlay network communications through the physical underlay network between a UniManet Parasitic Proxy and other UniManet Parasitic Proxies, the UniManet Server and all UniManet system elements in the virtual UniManet overlay network.

Device & User Subscription Tables and Payload Request Processor 255 may keep an up-to-date copy of the authorized elephant payload requesters originating from the network as well as elephant flow payload devices on the network. Subsystem 255 may enable the overlay UniManet proxies to authenticate requesters and payload sources for other UniManet Proxy subsystems.

Payload Delivery Processor 256 may operate in Store and forward mode. Processor 256 may be the first UniManet Proxy in the path of the transfer elephant flow to be delivered, and may store the entire elephant flow until it is delivered successfully, but it may decide based on various conditions such as what is the optimal packet size for delivery and may start forwarding packets even before the complete Elephant Flow is received. The Payload Delivery Processor 256 on all other UniManet Proxies in the path may start storing packets and forward the packets as they are received but may alternatively keep all packets received until the Elephant Flow request has been processed. This precaution is taken in case retransmissions of certain packets or the entire elephant flow is requested, so they can be executed by the node closest to the destination. Processor 256 is responsible for monitoring the successful delivery of the Elephant Flow from the node it is running to the next node in the path, and notify the UniManet server accordingly. The Payload Delivery Processor 256 may also be responsible for monitoring the successful delivery of the Elephant Flow from source to destination, and may alert the respective subsystems if there are issues that require resolution in order to complete the transfer. Once the Payload Delivery Processor 256 becomes aware that its part in the elephant flow transfer is successfully completed, it may notify the UniManet Server. Once the End Of Transfer and Reversal command is received from the UniManet Server, Subsystem 256 may pass the command to the Manipulation & Overwrite Processor for execution, may receive a report that everything is back to normal and may notify the UniManet Server accordingly.

Topology Processor 258 may keep track and perform updates of both the physical underlay ad-hoc network topology and the virtual UniManet overlay network and all UniManet Proxies in communication with the UniManet Server Topology Processor. Processor 258 may make the topology information available to all UniManet Proxy SW subsystems. In order to perform this function processor 258 exchanges control information with all the UniManet Servers in the network as well as neighboring nodes in the overlay network reserved path.

Manipulation & Overwrite Processor 260 may function as follows. Once the Elephant Flow Start Transfer request has been received from the UniManet Server by the Payload Delivery Processor and the request has been approved the payload delivery processor may forward the Elephant Flow Start Transfer request to manipulation and overwrite processor 260 to perform the required manipulation on the underlay physical network node it resides in to make the current node ready for transfer and define it as part of the reserved and protected path. Once performed processor 260 may notify the Payload Delivery Processor that the current node is ready for execution of the elephant flow transfer. Once the End Of Transfer and Reversal command is received from the Payload Delivery Processor, processor 260 may perform the reverse manipulation, verify it was successful and report everything is back to normal to the Payload Delivery Processor.

The Path Integrity and Monitoring 262 monitors the neighboring nodes in the reserved path to be aware of any communication issues or topology changes affecting the neighboring nodes. For example, if due to mobility or interferences, some of the communication links experience disconnections or very high error rate, monitoring 262 may notify the respective SW modules and subsequently the UniManet server, and if possible perform path changes autonomously, with reporting to the UniManet Server. Path integrity and monitoring module 262 may be set to monitor communication link quality with the neighboring nodes and provide this information to the UniManet Server for path decisions.

Figure 13:
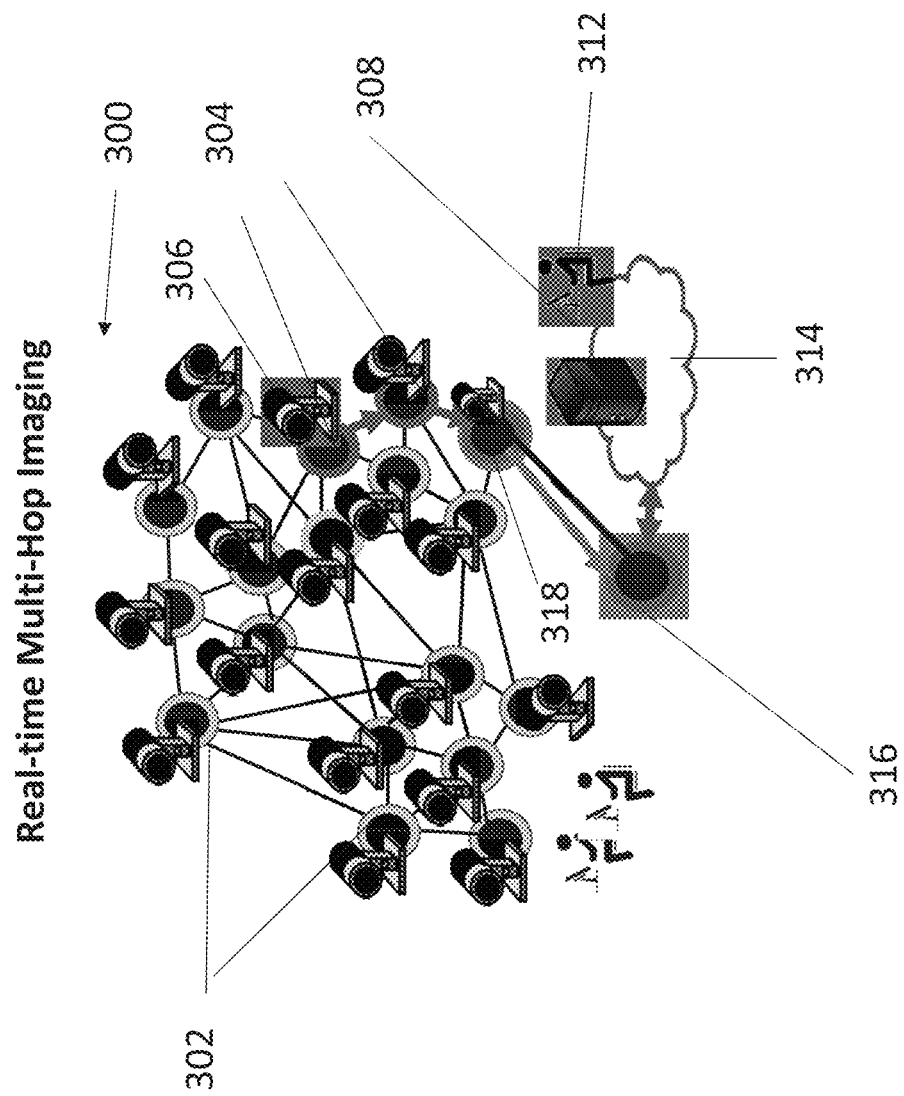
FIG. 13 is a simplified block diagram showing a network with real time multi-hop imaging according to embodiments of the present invention.

Reference is now made to FIG. 13, which is a simplified diagram showing real time multi-hop connections made for imaging according to the present embodiments. A network 300 comprises an Ad-Hoc/Manet or Mesh Network Node 302 with UniManet (*) Add-On Overlay Virtual Network Parasitic Proxy on top of the underlay physical network generated by all nodes. The overlay is in Monitoring Mode.

Ad-Hoc/Manet or Mesh Network Node 304 has UniManet (*) Add-On Overlay Virtual Network Parasitic Proxy on top of the underlay physical network generated by all nodes, and the overlay is in UniTransfer Mode.

Video/Imaging Camera, Sensor or IoT/M2M Device source 306 transmits elephant flow payload to destination 308 through the UniManet Parasitic Proxy overlay network nodes and the associated underlay physical network ad-hoc network nodes (204 in red) in the protected UniTransfer path.

UniManet(*) Overlay Virtual Network and Proxy Management Server 310 manages payload delivery to requesting user 312 behind the local network 314. The UniManet(*) server works in concert with all UniManet(*) Add-On Overlay Virtual Network Parasitic Proxies on top of the underlay physical network generated by all nodes to deliver elephant flow payload. The Earth Station is connected on one side to the ad-hoc/Mesh physical underlay and the UniManet virtual overlay networks, and on the other side to the terrestrial local network 314. The UniManet Server is also connected to the local network at the earth station 314 where the requesting network user 312 resides.

Network user 312, who is connected to the local network 312 behind the Ad-Hoc/Manet or Mesh Network Node makes a payload elephant flow request from a specific Video/Imaging Camera, Sensor or IoT/M2M Device 306 behind any node in the network Earth Station Communication Subsystem 316 in this example typically encompasses Payload high data rate and low data rate links and Ad-Hoc/Manet or Mesh Network Node with UniManet(*) Add-On Overlay Virtual Network Parasitic Proxy on top of the underlay physical network node in UniTransfer Mode and thus becomes a member of both the physical network and the overlay network. Earth Station Communication System 316 also connects the internal network with the UniManet (*) Server and users requesting payload.

In this example the Ad-Hoc/Manet or Mesh Network Node 318 represents the satellite currently visible and currently connected with Earth-Station 316 via the high data rate elephant flow payload download and also through the low data rate link so that the UniManet(*) Add-On Overlay Virtual Network Parasitic Proxies on top of the underlay physical network are connected in both the earth station node and the visible satellite node and through the visible satellite UniManet Parasitic Proxy overlay network node to all nodes in UniTransfer Mode currently forming the protected UniTransfer path, as well as all UniManet Proxy nodes.

Figure 14:
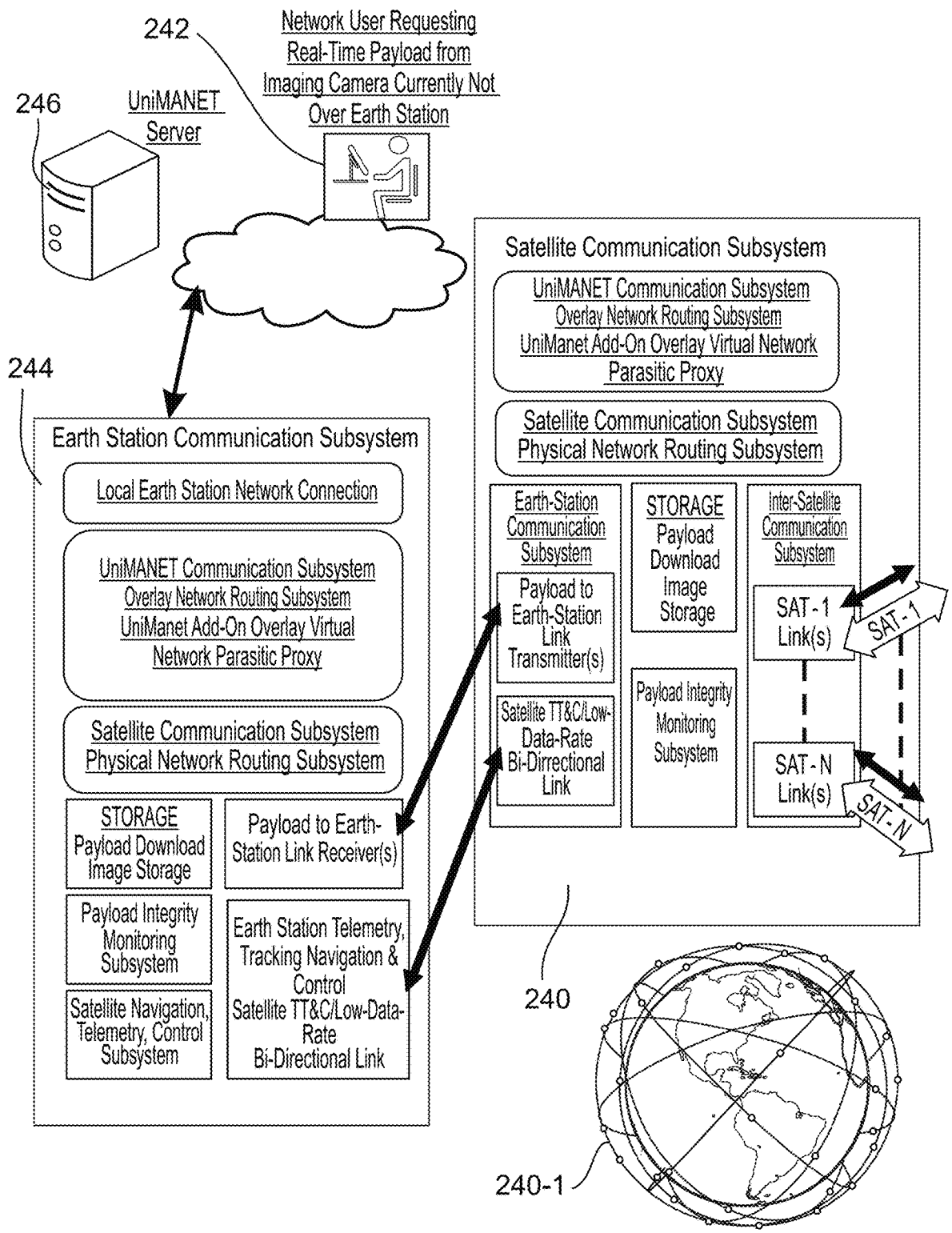
FIG. 14 is a simplified block diagram illustrating unidirectional traffic optimization in satellite constellations according to embodiments of the present invention.

Reference is now made to FIG. 14 which is a simplified schematic diagram showing a schematic illustration of elements involved in a UniManet(*) Unidirectional Traffic Optimization according to embodiments of the present invention which may be used in LEO, LEO-MEO, LEO-GEO, MEO-GEO, and LEO-MEO-GEO Satellite Constellations. The elements include a satellite communications subsystem 240, a networked user 242, an earth station communication subsystem 244 and a server 246. In addition, a typical LEO satellite constellation example 240 is shown, solely for the clarification of the LEO satellite embodiment. Constellation example 240 is shown for clarification of the LEO satellite example.

Typically, in the prior art there are a few ground stations, imaging satellites take images and place the image data into memory and when they pass over ground station they download the stored image data. A satellite may be seen on top of the ground station perhaps once a day or few times per day depending on the altitude.

By contrast, in the present embodiments, it is now possible to transfer images or video in real time from a satellite that may be a few satellite hops away from the earth station.

When moving from off-line imaging where the satellite only transfers images/video when over a ground station to real time transmission anywhere on the globe, the imaging/video information may be relayed through various satellites until it reaches the satellite that is currently over the ground station and can transmit the images. This multi-hop payload relay may experience performance degradation and latency and as a result, since the window of opportunity for payload transfer to the ground station is also limited in time (30-45 mins perhaps), a solution for such a network to ensure delivery of images/video in real-time over a volatile and multi-hop satellite network may be provided.

The present embodiments deal with AD-HOC/MESH network routing being used to maintain a bi-directional network between all the satellites as well as with the ground station(s). Such a network operates all the time, and in the case of for example a LEO Satellite real-time imaging constellation, real-time imaging via photo or video are transmitted from a specific satellite upon request, and most of the time only low data rate communication is required to maintain the network and to transmit commands from the ground station(s) to the satellites.

As discussed above, if we were to use a regular ad-hoc/mesh network routing also for real-time image transfer, due to the rapid performance degradation dependent on bandwidth and number of hops we could not guarantee imaging information delivery, meaning it would not be possible to plan image transfer or tune the network for such a transfer. The present embodiments may thus provide an overlay/override routing mechanism which keeps track of the network topology, and when a request to transfer imaging from a specific satellite is received, the routing mechanism calculates the path(s), and overrides the standard ad-hoc/mesh routing in the satellites with a unidirectional multi-hop relay path from the target satellite to the earth station. In embodiments the path may be isolated from all other satellites in the network, thus ensuring that the path in the direction from the target satellite towards the ground station and through all the satellites hops in between, is kept clear from other activities, forming a unidirectional highway ensuring the optimal delivery of the real-time imaging. Once payload transfer is completed, and the multi-hop relay path is not required anymore, the satellites in the path may return to normal operation within the satellite network. It is important to note that the direction from the ground station to the satellite continues to work the usual way, and so commands from ground stations may reach the target satellite all the time.

FIG. 14 is a schematic illustration of elements involved in a UniManet(*) Unidirectional Traffic Optimization according to embodiments of the present invention which may be used in LEO, LEO-MEO, LEO-GEO, MEO-GEO, and LEO-MEO-GEO Satellite Constellations.

A network user 242 may be in the terrestrial network or in fact anywhere with access to the terrestrial network. The user sends a UniTransfer Request to the UniManet Server on the terrestrial network to start receiving high resolution photos or video or the like, generally referred to as an elephant data flow, from a specific imaging camera within one of the LEO satellites in the constellation, possibly not currently visible at the earth station communication subsystem 244.

A UniManet Server 246 may be located in the terrestrial network and may receive solicited UniTransfer requests from authorized network users, or unsolicited triggered requests from UniManet Proxies within the satellites in the constellation. The responsibilities and tasks of the UniManet Server in executing the UniManet transfer requests are described elsewhere herein.

The Earth Station Communication Subsystem 244 is connected to both to the terrestrial network and the Communication Subsystem of the Satellite currently visible from the Earth Station—Box 240. In a LEO/MEO/HEO satellite constellation, the satellite can change depending on the satellite constellation design. The Earth Station Communication Subsystem implements both the ad-hoc/mesh physical underlay network node routing, as well as the UniManet Parasitic Proxy overlay network functionality described elsewhere herein.

Typically such an Earth Station Communication Subsystem example described in 244 may include (among others) the following subsystems in order to embody the invention:

Local Earth Station Connection in order to be able to facilitate UniManet virtual overlay connectivity with the UniManet server.

UniMANET Communication Subsystem implementing the UniManet overlay network routing subsystem and other functions of the UniManet Add-On Overlay Virtual Network Parasitic Proxy described elsewhere herein.

Satellite Communication Subsystem implementing the underlay physical network ad-hoc/mesh routing and maintaining underlay network connectivity using an Ad-Hoc prior art network protocol such as OSLR.

Ample storage for downloaded images, tables and other information required for the implementation of the present embodiments as well as underlay physical network functionality.

Typically physical underlay network may include a payload monitoring subsystem to ensure data integrity. This is simply by way of example, and this functionality could be integrated into other subsystems.

A satellite navigation, telemetry and control subsystem maintaining functionality of the satellite constellation A payload to earth high data rate receive capability for the elephant flow data to be swiftly downloaded to the earth station from the satellite currently visible from the earth station.

A bi-directional low data rate sub-system for UniManet Overlay Network commands and control information flow, Underlay Physical network commands and control information flow, Earth Station Telemetry, Tracking Navigation & Control, Satellite TT&C etc.

Other subsystems may be required, as known to the skilled person, but are not described.

The Satellite Communication Subsystem 240 may have different communication subsystems for inter satellite communications and earth station communications. When the earth station is visible, the satellite may communicate with the Earth-Station Communication Subsystem 244. In addition, at all times, each satellite in this example may communicate with a number of neighboring satellites in the same constellation using the Inter-Satellite Communication Subsystem. The Satellite Communication Subsystem implements both the ad-hoc/mesh physical underlay network node routing, as well as the UniManet Parasitic Proxy overlay network functionality described elsewhere herein.

Typically such a Satellite Communication Subsystem as example described with reference to numeral 240 may include (among others) the following subsystems:

UniMANET Communication Subsystem implementing the UniManet overlay network routing subsystem and other functions of the UniManet Add-On Overlay Virtual Network Parasitic Proxy described elsewhere herein.

Satellite Communication Subsystem implementing the underlay physical network ad-hoc/mesh routing and maintaining underlay network connectivity using an Ad-Hoc prior art network protocol such as OSLR for example.

Ample storage for downloaded images, tables and other information required for implementation as well as underlay physical network functionality.

Typically, a physical underlay network may include a payload monitoring subsystem to ensure data integrity, or such functionality may alternatively be integrated into other subsystems A satellite navigation, telemetry and control subsystem maintaining the proper functionality of the satellite in contact with the earth station TT&C.

An Earth-Station Communication Subsystem including both a payload to earth high data rate transmit capability for the elephant flow data to be swiftly downloaded to the earth station from the satellite currently visible from the earth station, and a bi-directional low data rate sub-system for UniManet Overlay Network commands and control information flow, Underlay Physical network commands and control information flow, Earth Station Telemetry, Tracking Navigation & Control, Satellite TT&C etc. Other subsystems may be required, as known to the skilled person, but are not described, for the sake of simplicity.

An Inter-Satellite Communication Subsystem equipped with a bi-directional links to the number of neighboring satellites dictated by the satellite constellation design. Each such communication link maintains both low data rate control information exchange between satellites, and high data rate elephant flow data transfer between satellites. The number of satellites each satellite can communicate with, and whether such communication links are bi directional or unidirectional, or a combination for example low data rate bi-directional and high data rate uni-directional, or a single link for both are all influenced by the satellite constellation design considerations. Embodiments may be varied to adapt to any such design considerations.

Figure 15:
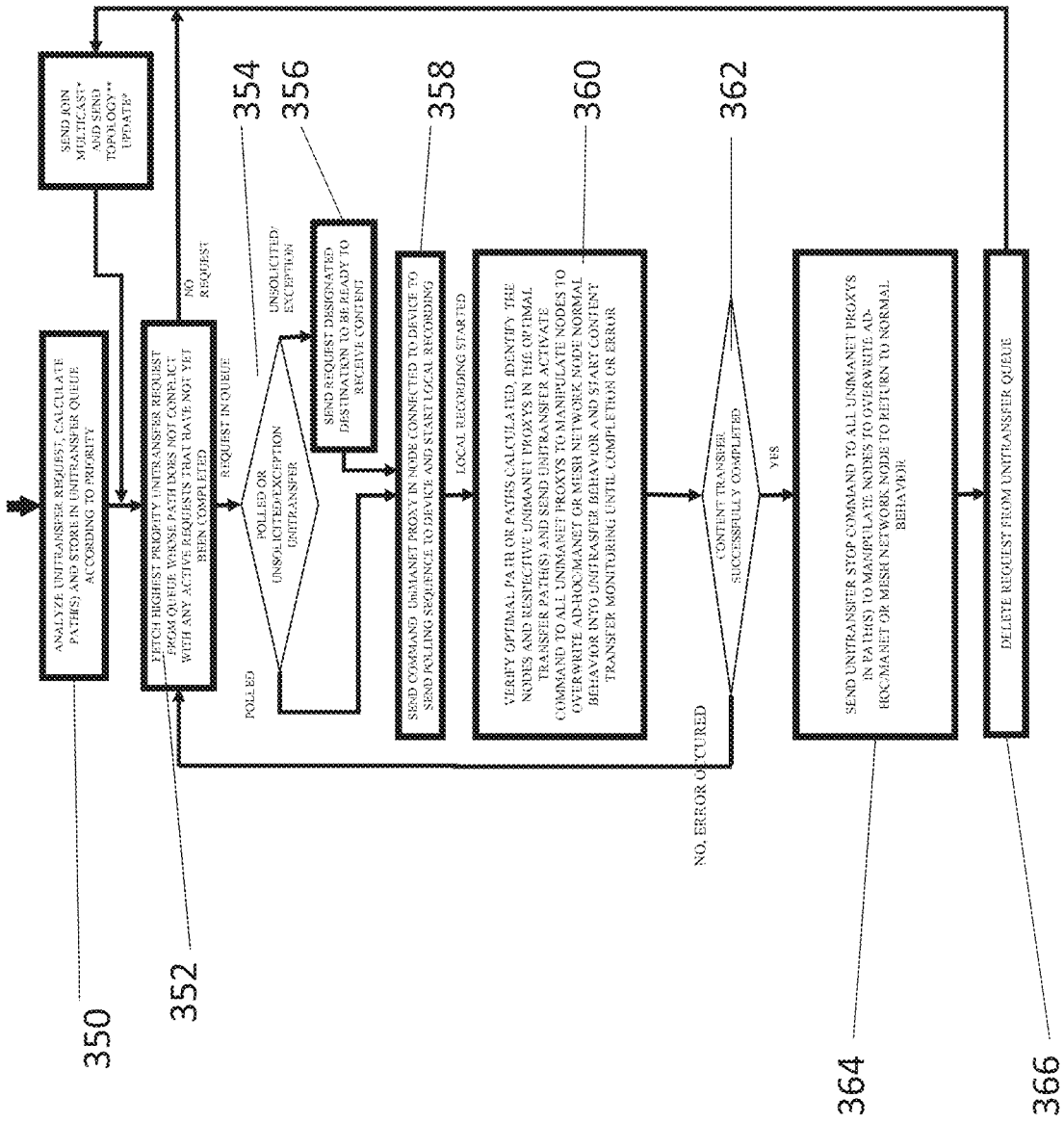
FIG. 15 is a simplified flow diagram showing UniTransfer request handling at a server according to embodiments of the present invention.

Reference is now made to FIG. 15, which is a simplified flow chart illustrating how a request for transferring an image or elephant flow received by a UniManet Server is handled by sending commands to the relevant overlay virtual network UniManet Proxy nodes in the path to perform UniManet manipulations for reserving a clear pathway and monitoring the UniTransfer elephant flow from start to end, and then sending out commands to reverse the physical underlay network when the elephant flow is over and the network may return to normal.

A request for transferring an image or other large elephant flow of data is made, hereinafter referred to as a UniTransfer request. In box 350, we analyze the UniTransfer request, calculate path(s) and store in a UniTransfer queue according to a priority. In general the UniManet Servers runs a subscription for all the allowed UniTransfer requesters of elephant data transfers and their group priority. In addition, when a request is made, the requester can specify/request a priority for a given UniTransfer request, if granted and there are requests already in the queue waiting to be executed, such that higher priority requests may be put ahead of lower priority requests in the UniTransfer execution queue. In box 352, the highest priority UniTransfer request from the queue whose path does not conflict with any active requests that have not yet been completed, is fetched.

UniTransfer requests may generally be of two types, although there may be others not included for simplification purposes. One type is a UniTransfer requests solicited or by a user in the ad-hoc/mesh network or in a network behind the ad-hoc network and sent for execution to a UniManet Server or as a response to a poll request, referred to as polled UniTransfer Requests. The other common type of request is often named "unsolicited/exception requests", and may be triggered by the source device itself, for example a motion detection camera set for starting unsolicited transmission if motion is detected. Since the common form of elephant load transfer is store and forward, namely there is enough memory to start recording the elephant flow in the node behind the source device to transmit from internal memory once the UniTransfer path is established and the UniTransfer can start as described in this invention. Box 354 checks whether the UniTransfer request in the queue is a solicited/polled UniTransfer request or unsolicited/exception UniTransfer request as their handling differs. In the case of the request being unsolicited/exception, box 356 is entered and a proper command is sent over the overlay virtual network to the UniManet Parasitic Proxy where the source originates, to start recording the elephant flow and await to receive and start transfer along the protected path of this elephant flow once established. Thereafter box 358 is missed and process continues with box 360.

If the request is solicited/polled then the process continues in box 358 directly. In box 356 a command is sent to the UniManet(*) proxy in the node connected to the source device to send a start elephant data transfer to the associated network node and a command to the UniManet Parasitic Proxy associated with the transfer device to start local recording within the UniManet Parasitic Proxy overlay virtual network node.

Local recording of the image or video in general referred to as an elephant flow begins, and box 360 is entered. Herein, it is verified that an optimal path or paths have been calculated. Nodes for the path and respective UniManet (*) proxies in the optimal transfer path(s) are identified and then UniTransfer activate commands are sent to all UniManet(*) proxies to manipulate nodes to overwrite ad-hoc/Manet or mesh network node normal behavior into UniTransfer behavior and start content transfer monitoring, which is continued until completion or error.

Once elephant flow data content transfer is successfully completed, as checked in box 362 then flow continues to box 364. Otherwise, in the case of an error, flow returns to 352 to retransfer the elephant flow from node recordings. A proper mechanism protects the process not to enter in an endless loop and a limited number of elephant transfer retransmission retries is attempted before notifying the requester the UniTransfer request has failed. This last point is not depicted in the figure.

In box 364 a UniTransfer stop command is sent to all UniManet(*) proxies in the path or paths to manipulate nodes to overwrite the ad-hoc/Manet or mesh network node to return to normal behavior.

The completed request is deleted from the UniTransfer queue in block 366 and flow returns to box 354 to process the next request in the queue.

Figure 16:
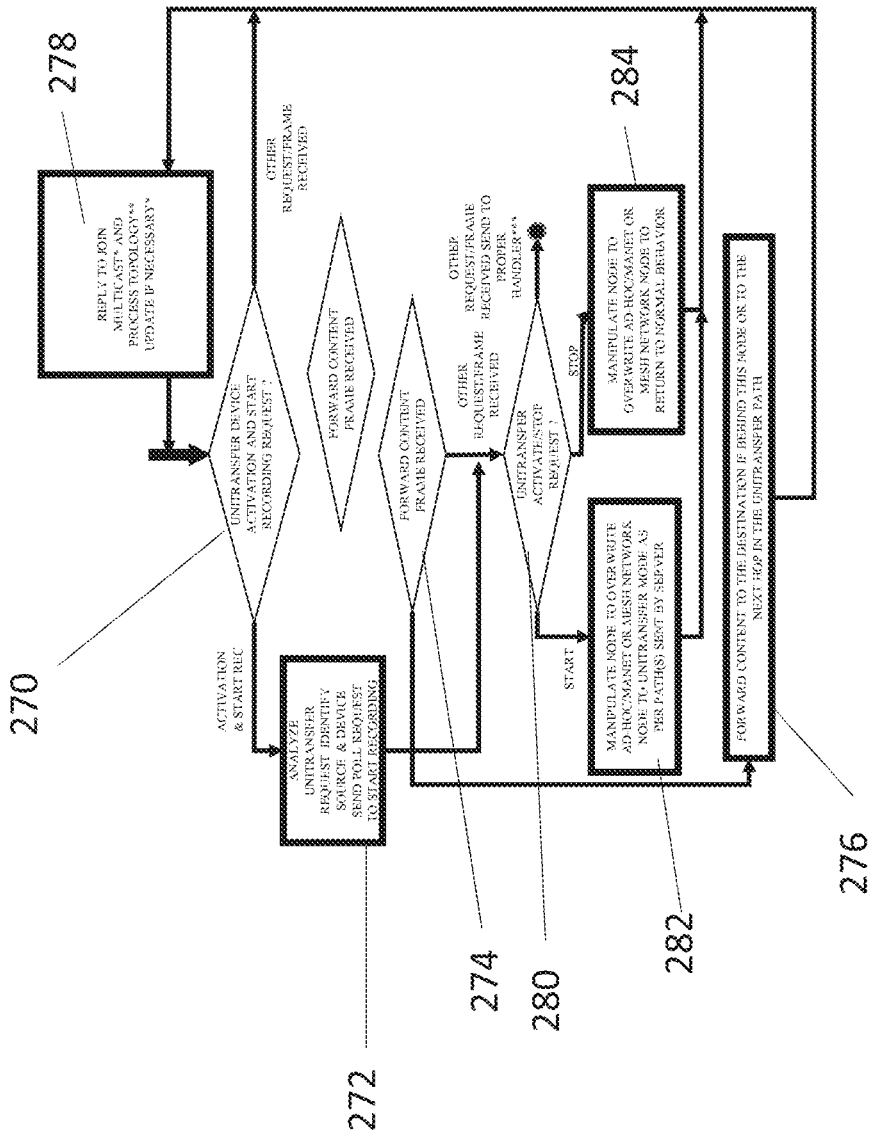
FIG. 16 is a simplified flow diagram showing a UniManet parasitic proxy-UniTransfer request according to embodiments of the present invention.

Reference is now made to FIG. 16, which is a simplified flow chart illustrating the UniTransfer request processing by the UniManet Parasitic proxies in the overlay virtual network, including the originating node of the elephant flow, all the way to the destination node. UniTransfer requests are commanded by a UniManet Server in the supervising overlay virtual network layer and sent to the relevant UniManet Parasitic Proxies in the path calculated by UniManet Server(s) for execution.

The UniManet Server at the overlay virtual network layer calculates paths, sends UniTransfer requests to the relevant nodes and monitors for UniTransfer request from the start to the successful completion over the calculated nodes path, and if necessary performs path changes throughout the UniManet transfer execution process, based on dynamic changes in the underlay ad-hoc/Mesh network. The UniManet Parasitic Proxies in the UniTransfer path may include the node where the elephant flow originates from all the way to the destination node. The UniManet Parasitic Proxy UniTransfer request process described in FIG. 16 covers the tasks when the current node is where the elephant flow originates and is responsible for device activation for the sending of a start recording request to initiate the Elephant Flow from the target device behind the source node in the physical underlay network, and start stop manipulation requests. The figure also describes intermediate nodes involved in the elephant flow transfer from source node to destination node—box 270.

In the event that the current node is the source node and an activation and start of recording command has been received, flow goes to box 272 to analyze the UniTransfer request, identify the source and device, and send a poll request to start recording. Flow continues to 274. If it is not one of the above requests, flow goes to check if any changes in the physical network have occurred, and if necessary notifies the relevant UniManet Servers and other nodes on the UniManet overlay virtual network.

The next step is to check whether this is the first time a UniManet manipulation request is received or the required manipulation has already been executed in this node. If this is not the first time, and the manipulation has already been performed, flow moves to box 276 where any elephant flow content or frame recorded/received is forwarded to the next node in the UniTransfer path. Content is here forwarded to the destination if the destination is behind the current node or the content is forwarded on to the next hop in the UniTransfer path. Flow goes on to box 278 to check if any changes in the physical network have been sensed by the ad-hoc/mesh network node where the UniManet Proxy is riding, and if necessary report to UniManet Servers and overlay virtual network proxies, and reply to join multicast etc. that may have been received as necessary.

After box 274 then flow goes to box 280 if the current process is the first time in the current flow that a UniManet manipulation request has been received by this node, and the required UniTransfer START or STOP manipulation needs to be executed in this node. In box 280 it is decided if it is a UniTransfer START or STOP request, and flow goes to box 282 to execute the START manipulation or box 284 to execute the STOP manipulation. Other requests or frames are sent to an appropriate handler.

The Start request 282 involves manipulating a node to overwrite the underlying ad-hoc/Manet or mesh network node to UniTransfer mode as per path(s) sent by server.

The stop request operates box 284 to stop manipulation of the node to overwrite ad-the hoc/Manet or mesh network node and instead to return to normal behaviour.

After the START or STOP manipulation has been executed the processing Flow goes on to box 278 to check if any changes in the physical network have been sensed by the ad-hoc/mesh network node where the UniManet Proxy is riding, and if necessary report to UniManet Servers and overlay virtual network proxies, reply to join multicast etc. that may have been received as necessary.

Figure 17:
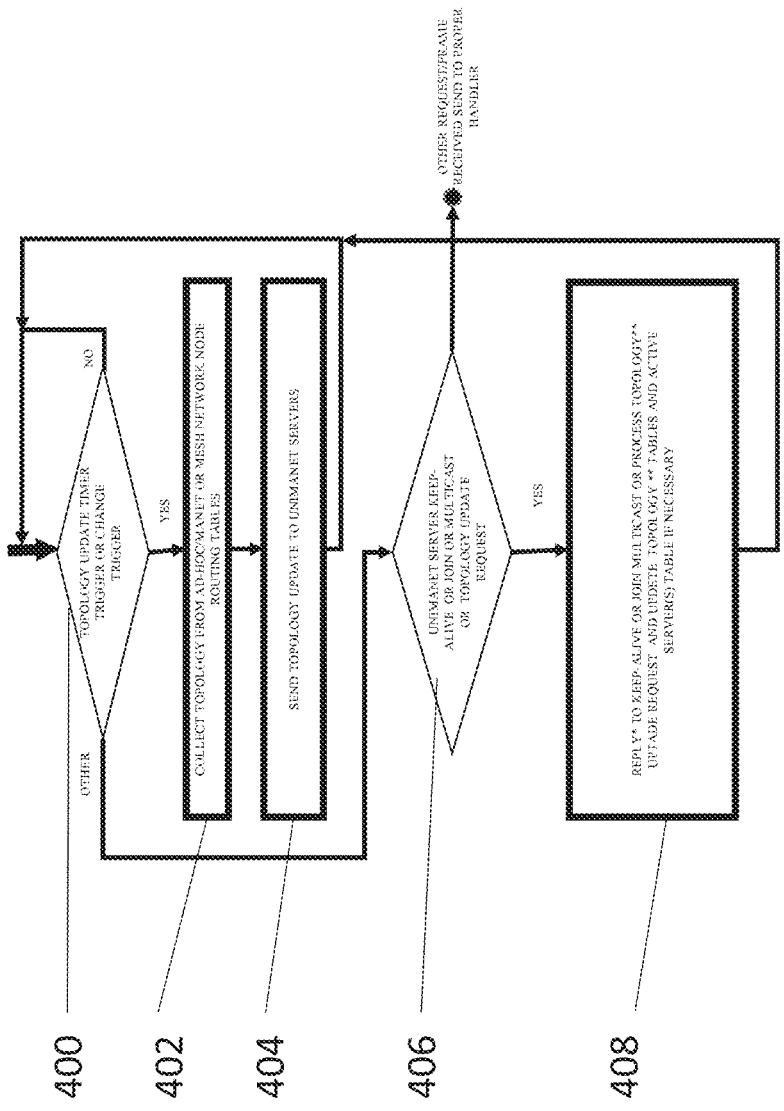
FIG. 17 is a simplified flow chart showing a UniManet Parasitic topology update according to embodiments of the present invention.

Reference is now made to FIG. 17, which is a simplified diagram that illustrates a UniManet (*) Parasitic Proxy Topology Update & UNIMANET(*) Server(s) Keep-Alive & Join procedure.

The topology of the underlay physical ad-hoc network may change dynamically, hence the overlay virtual network between the UniManet parasitic proxies and UniManet servers may be also periodically updated to be in sync with the physical underlay ad-hoc/Mesh network. For this purpose every UniManet Parasitic Proxy periodically collects the topology changes that may be recorded in the underlay physical ad-hoc network node it rides on top of, and updates the UniManet network nodes in the overlay virtual network, in order for them to be able to properly perform their duties. In addition UniManet Parasitic Proxies may be aware of all the UniManet Servers in the overlay network, and in order to do so, every UniManet Server also sends Keep Alive and Join Overlay network requests. In box 400 the UniManet Parasitic proxy checks if it is time for a topology update and/or receives a trigger indicating it is time to perform a topology update.

In the event of such a trigger, control passes to box 402 to collect the current topology from the underlay physical ad-hoc/Manet or mesh network node routing tables it is riding on top of.

In box 404 a topology update is sent to the UniManet (*) servers.

The UniManet Parasitic Proxy checks if it has received any UniManet (*) server or other proxies keep-alive or join or multicast or topology update requests in query box 406.

In the event of the requests received are not any of the above request types, the request received is sent to the proper handler.

In box 408, the UniManet Parasitic Proxy sends a reply if necessary to the keep-alive or join multicast or process overlay network topology update request and updates the overlay virtual network topology tables and active server(s) table kept inside the UniManet Parasitic Proxy if necessary.

In embodiments, ad hoc networks of autonomous vehicles or drones could provide real time images of remote locations or disaster locations or the like.

It is expected that during the life of a patent maturing from this application many relevant ad hoc networks and satellites will be developed and the scope of the corresponding terms is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Overlay apparatus for an ad-hoc/MESH communication network, the network comprising a plurality of nodes, at least one of said nodes being mobile with respect to other nodes, the nodes able to establish and abandon connections as they move with respect to one another, the nodes requiring small bandwidth communications in order to generate and maintain an ad-hoc/MESH physical network of said nodes using a routing protocol managed in a distributed manner over said ad-hoc/Mesh communication network, wherein the overlay apparatus is external to the routing protocol, and is configured to reserve at least one assured protected communication path between a source node and at least one destination node, of a priority communication having a bandwidth above a preset threshold, the reserved path being a unidirectional path in a first direction from said source node to said destination node, said reserved path being reserved for said priority communication and being via at least one additional node according to a current topology configuration of said connections of said ad hoc/MESH network, the overlay apparatus configured to reserve said path by overriding said distributed routing protocol to reserve said unidirectional path from said source node to said destination node via said at least one additional node, said overriding comprising causing said at least one additional node to be shown not to be available, in said first direction, to said distributed routing protocol for payload data communications requests, wherein said nodes are satellites in one member of the group comprising: low earth orbit, medium earth orbit, elliptical orbits, geostationary satellites and/or a combination of any of them with non-satellite nodes.

2. The overlay apparatus of claim 1, residing within each one of said plurality of nodes.

3. The overlay apparatus of claim 1, requiring small bandwidth communications in order to generate and maintain a physical and overlay network having a network node topology being parallel to a topology of said ad-hoc/MESH physical network, small being relative to said large bandwidth of said communication being assigned said reserved path.

4. The overlay apparatus of claim 1, configured to identify the nodes of said ad hoc/MESH network to form said assured protected path.

5. The overlay apparatus of claim 2, wherein said causing said at least one additional node to be unavailable comprises rendering said additional node invisible under said routing protocol to respective neighboring nodes not in said assured protected path, thereby preventing said neighbouring nodes from sending payload data communications over any nodes of said assured protected path, until such assured protected path is not required anymore.

6. The overlay apparatus of claim 1, wherein said network node connections are bi-directional for network control information.

7. The overlay apparatus of claim 1, wherein connections reserved for said reserved path are bi-directional for network control information and unidirectional for payload data.

8. The overlay apparatus of claim 1, wherein the establishing and abandoning of connections is carried out in a first underlay physical network supervision/routing layer and said overlay apparatus forms a second overlay network supervision/routing layer capable of overriding and/or manipulating control information and control behavior of certain nodes in said first underlay physical network supervision/routing layer by causing selected nodes to disappear from view of said first underlay physical network supervision/routing layer for payload data communication requests.

9. The overlay apparatus of claim 1, configured to change said reserved path if said current configuration and topology changes, or to reserve at least two paths in parallel for said respective priority payload data communication.

10. The overlay apparatus according to claim 1, configured to receive a solicited request or poll for priority payload data transfer requests or an unsolicited priority payload data transfer needing to be delivered to a destination in the said network and to identify said priority payload data bandwidth request from said polling or solicited or unsolicited request or said unsolicited data transfer.

11. The overlay apparatus of claim 1, configured to identify a plurality of requests for priority payload data communications from different nodes and to place said requests in a queue.

12. The overlay apparatus of claim 11, configured to arrange said queue according to a priority.

13. The overlay apparatus of claim 1, configured to identify a plurality of priority payload data communications from different nodes and to reserve paths respectively for each priority payload data communication.

14. The overlay apparatus of claim 1, configured to determine available bandwidth in said ad hoc/MESH network and to set up respective reserved/assured protected paths accordingly.

15. Overlay method for an ad-hoc/MESH communication network, the network comprising a plurality of nodes, at least one of said nodes being mobile with respect to others of said nodes, the nodes configured to establish and abandon connections as they move with respect to one another using a distributed routing and communication protocol in a first layer, the connections carrying traffic of small bandwidth for network control information, and/or shared capabilities for unidirectional or bi-directional payload data transfer, the overlay method overriding said first layer, the overriding comprising:
 identifying priority payload data communications requirements over the network or receiving transfer requests for said priority payload data communications, the priority payload data communications being of at least a predetermined threshold bandwidth; and
 reserving at least one path over a current configuration of said connections of said ad hoc/MESH network solely for a respective one of said priority payload data communications, said reserving comprising overriding said distributed routing protocol to reserve a unidirectional path from said source node to said destination node via at least one additional node, said reserving comprising showing said at least one additional node to be invisible to said first layer for payload data communication requests, thereby overriding said first layer, wherein said nodes are satellites in one member of the group comprising: low earth orbit, medium earth orbit, elliptical orbits, geostationary satellites and/or a combination of any of them with non-satellite nodes.

16. A network server for an ad-hoc/MESH communication network, the network comprising a plurality of nodes, at least one of said nodes being mobile with respect to other nodes, the nodes establishing and abandoning connections as they move with respect to one another using a routing communication protocol managed in distributed manner over said nodes in a first layer, the nodes requiring a small bandwidth for bi-directional network control information communications and the server configured to identify priority payload data communication for transfer over said network from a source node to a destination node via at least one additional node in a first direction according to a current topology configuration of said nodes, the priority payload data communication being larger than a predetermined threshold bandwidth, the server configured to override said first layer and reserve at least one assured protected communication path between said source and said destination nodes via said at least one additional node for said priority payload data communication, said reserving providing a unidirectional path from said source node to said destination node via said at least one additional node by overriding said first layer making said at least one additional node invisible in said first direction to said first layer for payload communications, wherein said nodes are satellites in one member of the group comprising: low earth orbit, medium earth orbit, elliptical orbits, geostationary satellites and/or a combination of any of them with non-satellite nodes.

* * * * *